US011001403B2

(12) United States Patent
Garitz et al.

(10) Patent No.: US 11,001,403 B2
(45) Date of Patent: May 11, 2021

(54) DEVICE, IN PARTICULAR FOR CLOSING A HEAD REGION OF A FOODSTUFFS CONTAINER MADE OF A LAMINATE HAVING AN EDGE REGION WHICH IS SKIVED AND PARTIALLY FOLDED OVER ITSELF

(71) Applicant: SIG Technology AG, Neuhausen (CH)

(72) Inventors: Norbert Garitz, Julich (DE); Manfred Krausen, Julich (DE); Thomas Vetten, Dusseldorf (DE); Holger Schmidt, Inden-Lamersdorf (DE); Ulrich Alef, Wegberg (DE)

(73) Assignee: SIG Technology AG, Neuhausen (CH)

( * ) Notice: Subject to any disclaimer, the term of this patent is extended or adjusted under 35 U.S.C. 154(b) by 400 days.

(21) Appl. No.: 15/523,254

(22) PCT Filed: Oct. 9, 2015

(86) PCT No.: PCT/EP2015/073333
§ 371 (c)(1),
(2) Date: Apr. 28, 2017

(87) PCT Pub. No.: WO2016/066401
PCT Pub. Date: May 6, 2016

(65) Prior Publication Data
US 2017/0313459 A1 Nov. 2, 2017

(30) Foreign Application Priority Data
Oct. 31, 2014 (DE) .................... 10 2014 015 959.0

(51) Int. Cl.
B65B 51/26 (2006.01)
B29C 65/08 (2006.01)
(Continued)

(52) U.S. Cl.
CPC .............. B65B 51/26 (2013.01); B29C 65/08 (2013.01); B29C 65/8253 (2013.01);
(Continued)

(58) Field of Classification Search
CPC .. B65B 7/02; B65B 7/08; B65B 51/22; B65B 51/146; B65B 51/225
(Continued)

(56) References Cited

U.S. PATENT DOCUMENTS 2,333,330 A * 11/1943 Moore .................... B65D 75/26
493/189
2,440,339 A * 4/1948 Langer .................... B65D 35/02
138/128
(Continued)

FOREIGN PATENT DOCUMENTS

BE          558784 A       7/1957
CN       101678607 A       3/2010
(Continued)

OTHER PUBLICATIONS

The State Intellectual Property Office of the People's Republic of China, Office Action (Chinese Appl. No. 2015800261447), dated Jul. 31, 2018, pp. 1-7.
(Continued)

Primary Examiner — Thanh K Truong
Assistant Examiner — David G Shutty
(74) Attorney, Agent, or Firm — Taft Stettinius & Hollister LLP

(57) ABSTRACT

The invention relates to a device comprising a first fixing element, a further fixing element and a folded planar composite;
wherein the first fixing element comprises a first fixing surface and the further fixing element comprises a further fixing surface;
(Continued)

wherein the folded planar composite is at least partially fixed between the first fixing surface and the further fixing surface;

wherein the folded planar composite comprises a first composite region;

wherein the first composite region comprises a first layer sequence comprising a first composite layer comprising a first carrier layer, a second composite layer comprising a second carrier layer, a third composite layer comprising a third carrier layer and a fourth composite layer comprising a fourth carrier layer;

wherein in the first composite region the second composite layer is joined to the third composite layer and the third composite layer is joined to the fourth composite layer;

wherein in the first composite region the third carrier layer is characterised by a smaller layer thickness than in each case one selected from the group consisting of the first carrier layer, the second carrier layer and the fourth carrier layer or a combination of at least two of these;

wherein the first fixing surface or the further fixing surface or both comprises a recess comprising a first recess region;

wherein the first composite region is located at least partially between the first recess region and the first fixing surface or the further fixing surface.

28 Claims, 19 Drawing Sheets

(51) Int. Cl.
| | | |
|---|---|---|
| *B29C 65/82* | (2006.01) | |
| *B29C 65/00* | (2006.01) | |
| *B65D 5/42* | (2006.01) | |
| *B65D 5/06* | (2006.01) | |
| *B65B 51/14* | (2006.01) | |
| *B65B 51/30* | (2006.01) | |
| *B65B 7/16* | (2006.01) | |
| *B65B 51/22* | (2006.01) | |
| *B65B 55/08* | (2006.01) | |
| *B65B 55/10* | (2006.01) | |
| *B29L 31/00* | (2006.01) | |
| *B29K 705/02* | (2006.01) | |
| *B29C 65/16* | (2006.01) | |
| *B29C 65/14* | (2006.01) | |
| *B29C 65/10* | (2006.01) | |

(52) U.S. Cl.
CPC ........ *B29C 66/112* (2013.01); *B29C 66/1122* (2013.01); *B29C 66/135* (2013.01); *B29C 66/346* (2013.01); *B29C 66/43122* (2013.01); *B29C 66/7234* (2013.01); *B29C 66/72321* (2013.01); *B29C 66/73115* (2013.01); *B29C 66/81417* (2013.01); *B29C 66/81419* (2013.01); *B29C 66/81422* (2013.01); *B29C 66/81425* (2013.01); *B29C 66/81431* (2013.01); *B29C 66/849* (2013.01); *B29C 66/9513* (2013.01); *B29C 66/9517* (2013.01); *B65B 7/16* (2013.01); *B65B 51/144* (2013.01); *B65B 51/225* (2013.01); *B65B 51/30* (2013.01); *B65B 51/303* (2013.01); *B65B 55/08* (2013.01); *B65B 55/10* (2013.01); *B65D 5/064* (2013.01); *B65D 5/067* (2013.01); *B65D 5/4279* (2013.01); *B29C 65/10* (2013.01); *B29C 65/1406* (2013.01); *B29C 65/1412* (2013.01); *B29C 65/1425* (2013.01); *B29C 65/1616* (2013.01); *B29C 65/1619* (2013.01); *B29C 65/1674* (2013.01); *B29C 66/71* (2013.01); *B29K 2705/02* (2013.01); *B29L 2031/7166* (2013.01)

(58) Field of Classification Search
USPC .............................................. 53/373.7, 374.8
See application file for complete search history.

(56) References Cited

U.S. PATENT DOCUMENTS

| | | | | |
|---|---|---|---|---|
| 2,944,715 | A | | 7/1960 | Vergobbi |
| 3,067,923 | A | | 12/1962 | Thiets |
| 3,092,248 | A | | 6/1963 | Lane et al. |
| 3,106,327 | A | | 10/1963 | Karl |
| 3,197,112 | A | | 7/1965 | Meyer-Jagenberg |
| 3,422,730 | A | * | 1/1969 | Junod ................ B31B 50/00 493/121 |
| 3,506,516 | A | * | 4/1970 | Baumann ........... B29C 66/346 156/226 |
| 3,604,317 | A | | 9/1971 | Baun |
| 3,654,842 | A | * | 4/1972 | Schwenk ........... B29C 66/4322 493/287 |
| 3,846,220 | A | * | 11/1974 | Buchner ............ B65D 5/4279 428/43 |
| 3,910,014 | A | * | 10/1975 | Braun ............ B29C 66/72328 53/370.6 |
| 4,048,935 | A | * | 9/1977 | Beveridge ........... B21D 51/28 413/1 |
| 4,159,220 | A | * | 6/1979 | Bosche ............... B29C 66/135 156/73.1 |
| 4,239,150 | A | * | 12/1980 | Schadowski ........ B65D 5/4279 229/198.2 |
| 4,471,884 | A | | 9/1984 | Kuchenbecker |
| 4,515,580 | A | | 5/1985 | Lovelace |
| 4,546,911 | A | | 10/1985 | Clauss |
| 4,558,814 | A | | 12/1985 | Ihde |
| 4,572,426 | A | * | 2/1986 | Lisiecki ................ B65D 5/067 229/190 |
| 4,589,591 | A | * | 5/1986 | Sjostrand ........... B29C 65/3656 229/198.2 |
| 4,802,620 | A | * | 2/1989 | Phillips ................ B65D 5/067 229/125.42 |
| 5,067,302 | A | * | 11/1991 | Boeckmann .......... B29C 66/723 53/374.8 |
| 5,236,408 | A | | 8/1993 | McAdam, III et al. |
| 5,622,308 | A | * | 4/1997 | Ito ........................ B65D 3/06 229/198.2 |
| 5,810,243 | A | * | 9/1998 | DiPinto ............... B65D 5/4279 229/198.2 |
| 5,924,267 | A | | 7/1999 | Bömer et al. |
| 6,110,548 | A | * | 8/2000 | Kinsey .................... B32B 27/10 428/34.2 |
| 6,260,333 | B1 | * | 7/2001 | Stamm .................... B31B 50/00 53/374.2 |
| 6,335,390 | B1 | | 1/2002 | Seeger et al. |
| 6,986,232 | B1 | | 1/2006 | Kume et al. |
| 2002/0166887 | A1 | * | 11/2002 | Matsuoka ........... B65D 5/4266 229/117 |
| 2002/0170272 | A1 | * | 11/2002 | Cooper ............... B29C 66/7373 53/450 |
| 2004/0011007 | A1 | * | 1/2004 | Kohl ................ B29C 66/81422 53/451 |
| 2004/0052987 | A1 | * | 3/2004 | Shetty ..................... B65D 3/22 428/34.2 |
| 2005/0255261 | A1 | | 11/2005 | Nomula |
| 2006/0046916 | A1 | | 3/2006 | Gamache et al. |
| 2008/0041860 | A1 | | 2/2008 | Wiedmeyer et al. |

(56) References Cited

U.S. PATENT DOCUMENTS

| | | | |
|---|---|---|---|
| 2012/0104078 A1 | 5/2012 | Yan | |
| 2016/0368205 A1* | 12/2016 | Wieduwilt | ........ B29C 66/43121 |

FOREIGN PATENT DOCUMENTS

| | | | | |
|---|---|---|---|---|
| DE | 9218601 U1 | 11/1994 | | |
| DE | 10027735 C1 | 10/2001 | | |
| DE | 102006045338 A1 | 4/2008 | | |
| DE | 102006045338 A1 * | 4/2008 | ........... | B29C 66/346 |
| EP | 0049460 A1 | 4/1982 | | |
| EP | 0095153 A1 | 11/1983 | | |
| EP | 1241100 A1 | 9/2002 | | |
| GB | 528547 A | 10/1940 | | |
| GB | 1509622 A | 5/1978 | | |
| JP | 2002067192 A | 3/2002 | | |
| JP | 2007091323 A | 4/2007 | | |
| JP | 2013/043684 A | 3/2013 | | |
| JP | 2013/180793 A | 9/2013 | | |
| JP | 2014141272 A | 8/2014 | | |
| WO | 90/09926 A2 | 9/1990 | | |
| WO | 92/08652 A1 | 5/1992 | | |
| WO | 03106155 A1 | 12/2003 | | |
| WO | 2008/133963 A1 | 11/2008 | | |
| WO | 2010/109000 A2 | 9/2010 | | |
| WO | 2011/088966 A1 | 7/2011 | | |
| WO | 2012/064478 A1 | 5/2012 | | |

OTHER PUBLICATIONS

European Patent Office, International Search Report, dated Apr. 13, 2016.

European Patent Office, Written Opinion of the International Searching Authority, dated Apr. 13, 2016.

Notification of Reasons for Refusal; English Translation of Office Action; Japanese Patent Office; Japanese Patent Application No. 2017-523368; dated Nov. 13, 2019; 10 pages.

* cited by examiner

100

100

100

100

101

1200

1500

1600

1700

1800

1900

DEVICE, IN PARTICULAR FOR CLOSING A HEAD REGION OF A FOODSTUFFS CONTAINER MADE OF A LAMINATE HAVING AN EDGE REGION WHICH IS SKIVED AND PARTIALLY FOLDED OVER ITSELF

CROSS-REFERENCE TO RELATED APPLICATIONS

The present application is a U.S. national stage of, and claims the priority benefit of, International Patent Application Serial No. PCT/EP2015/073333, filed Oct. 9, 2015 and also claims the priority benefit of German Patent Application Serial No. 10 2014 015 959.0, filed Oct. 31, 2014, the text and drawings of which are hereby incorporated by reference in their entireties.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Field of the Invention

For a long time foodstuffs, whether foodstuffs for human consumption or also animal feed products, have been preserved by being stored either in a can or in a glass jar closed with a lid. The shelf life can be increased here on the one hand by disinfecting as far as possible in each case the foodstuff and the container, here the glass jar or can, separately and then filling the container with the foodstuff and closing it. However, these measures, which in themselves have been proven for a long time, for increasing the shelf life of foodstuffs have a number of disadvantages, for example a downstream sterilization which is again necessary. Because of their essentially cylindrical shape, cans and glass jars have the disadvantage that very dense and space-saving storage is not possible. Furthermore, cans and glass jars have a considerable intrinsic weight, which leads to an increased consumption of energy during transportation. A quite high consumption of energy is moreover necessary for the production of glass, tinplate or aluminium, even if the raw materials used for this originate from recycling. In the case of glass jars, an increased outlay on transportation is an added complication. The glass jars are usually prefabricated in a glassworks and must then be transported to the foodstuffs filling plant utilizing considerable transportation volumes. Glass jars and cans moreover can be opened only with a considerable application of force or with the aid of tools, and therefore rather inconveniently. In the case of cans, there is also a high risk of injury from sharp edges which arise during opening. In the case of glass jars, glass splinters are forever entering into the foodstuff during filling or opening of filled glass jars, which in the worst case can lead to internal injuries on consumption of the foodstuff. Furthermore, labels must be stuck on to both cans and glass jars for identification and advertising of the foodstuffs content. Information and advertising images cannot be printed directly on to the glass jars and cans. In addition to the actual print, a substrate for this, a paper or a suitable film, and a fixing means, an adhesive or a sealing compositions, are thus necessary for this.

Other packaging systems for storing foodstuffs for a long period of time as far as possible without impairment are known from the prior art. These are containers produced from planar composites—often also called laminates. Such planar composites are often built up from a layer of thermoplastic, a carrier layer usually made of cardboard or paper, an adhesion promoter layer, a barrier layer and a further layer of plastic, as disclosed, inter alia, in WO 90/09926 A2.

These laminated containers already have many advantages over the conventional glass jars and cans. Nevertheless, possibilities for improvement also exist for these packaging systems.

Description of Related Art Including Information Disclosed Under 37 CFR 1.97 and 1.98

Laminated containers are thus often characterised in that they are made of a laminate which has been folded several times, wherein opposite end regions of the laminate have been sealed to one another in order first to form a jacket-like or tubular precursor of a closed container. The end regions sealed to one another form a longitudinal seam here, which will also be present in the closed container. This longitudinal seam comprises both on the inside of the container and on the outside a bordering edge of the laminate at which moisture can penetrate into the layered structure of the laminate, in particular into the carrier layer, which is usually made of cardboard or paper. This must be prevented at least on the inside of the longitudinal seam, since water-containing foodstuffs are to be stored in the container. In the prior art, for this a sealing strip of a polymer is sealed on to the inside over the length of the longitudinal seam. Such a sealing strip is a component which is additionally to be applied in the container's production process. Furthermore, the sealing strip must be sealable. Accordingly, it cannot be made merely of an aluminium layer, like the conventional barrier layer. In order to achieve a barrier action of the sealing strip, in the prior art the sealing strip is therefore often made of a sealable plastic having a barrier action, such as, for example, an EVOH layer. However, such a plastic which is capable of being a barrier is relatively expensive, which increases the container's production costs. Furthermore, the sealing of the sealing strip must be completely tight over the entire length of the longitudinal seam in order to be able to prevent penetration of moisture, since the sealing join and therefore on both sides of the sealing strip in each case a seam along the entire longitudinal seam faces the interior and therefore the foodstuff.

BRIEF SUMMARY OF THE INVENTION

The present invention relates to a device comprising a first fixing element, a further fixing element and a folded planar composite, in particular for closing a container precursor comprising the planar composite; a method for joining a first composite layer to a second composite layer of a planar composite by a first fixing element and a further fixing element; a closed container obtainable by the above method; a closed container comprising a seam and a depression; and a use of the above device.

Generally, an object of the present invention is to at least partly overcome a disadvantage which emerges from the prior art. A further object of the invention is to provide a container or a container precursor or both, wherein a production of the container or the container precursor is one selected from the group consisting of requiring less time, being less expensive and requiring less starting components, or a combination of at least two of these. A further object of the invention is to provide a container, wherein the container, in particular a head region of the container, is as far as possible gas- or liquid-tight or both. A further object of the invention is to provide a container or a container precursor or both, wherein the container or the container precursor comprises no barrier of plastic or comprises no additional barrier strip, in each case for sealing off the container or the container precursor from an interior. A further object of the invention is to provide a container or container precursor, wherein as few seams or sealing joins as possible are exposed to the foodstuff with which the container or container precursor is to be filled. A further object of the invention is to provide a container or a container precursor or both, wherein a production of the container or the container precursor is characterised by one selected from the group consisting of less development of dust, less development of noise and a longer service life of a splitting tool, or a combination of at least two of these. A further object of the invention is to provide a container or a container precursor or both, wherein as little additional joining material as possible, such as, for example, a sealing layer or an adhesive, is located between skived regions of a carrier material of the container or the container precursor lying one on the other. A further object of the invention is to provide a container or a container precursor or both, wherein there is a relatively large possibility of selection with respect to a layer thickness of a skived carrier layer of the container or the container precursor. A further object of the invention is to provide a container or a container precursor or both, wherein a skived region of a wall or the container or the container precursor is more stable or more rigid and thus more resistant or easier to process or both. A further object of the invention is to provide a container or a container precursor or both, wherein a seam of the container or the container precursor, preferably a longitudinal seam, is protected on the inside or outside or both from penetration of moisture. A further object of the invention is to provide a container, wherein a germ count of the container is lower for the same sterilisation. A further object of the invention is to provide a container, wherein the container falsifies as little as possible a taste of a product which the container contains. A further object of the invention is to provide a container, wherein the container has a combination of 2 or more of the above advantages. A further object of the invention is to provide a method for producing containers, wherein in the method fewer containers having an increased germ count are produced. A further object of the invention is to provide a method for producing containers, wherein a lower proportion of reject containers can be produced by the method. A further object of the invention is to provide a method for producing containers, wherein a lower production tolerance in a seam, preferably a lower seam width variation, of the container can be achieved with the method. A further object of the invention is to provide a method for producing containers, wherein the method has an increased process stability. A further object of the invention is to provide a method for producing containers, wherein the method is simpler or faster or both. A further object of the invention is to provide a method for producing containers, wherein less space for production installations is required for implementing the method. A further object of the invention is to provide a method for producing containers, wherein preferably in the head region of the container sealing which is as liquid- and gas-tight as possible is achieved. A further object of the invention is to provide a method for producing containers, wherein preferably in the head region of the container burning of container layers is avoided as far as possible. A further object of the invention is to provide a method for producing containers, wherein preferably in the head region of the container, during sealing and pressing, container layers are pressed together as uniformly as possible. A further object of the invention is to provide a method for producing containers, wherein the method has a combination of 2 or more of the above advantages.

A contribution towards at least partially fulfilling at least one of the above objects is made by the independent claims. The dependent claims provide preferred embodiments which contribute towards at least partially fulfilling at least one of the objects.

DETAILED DESCRIPTION OF THE INVENTION

Figure 1:
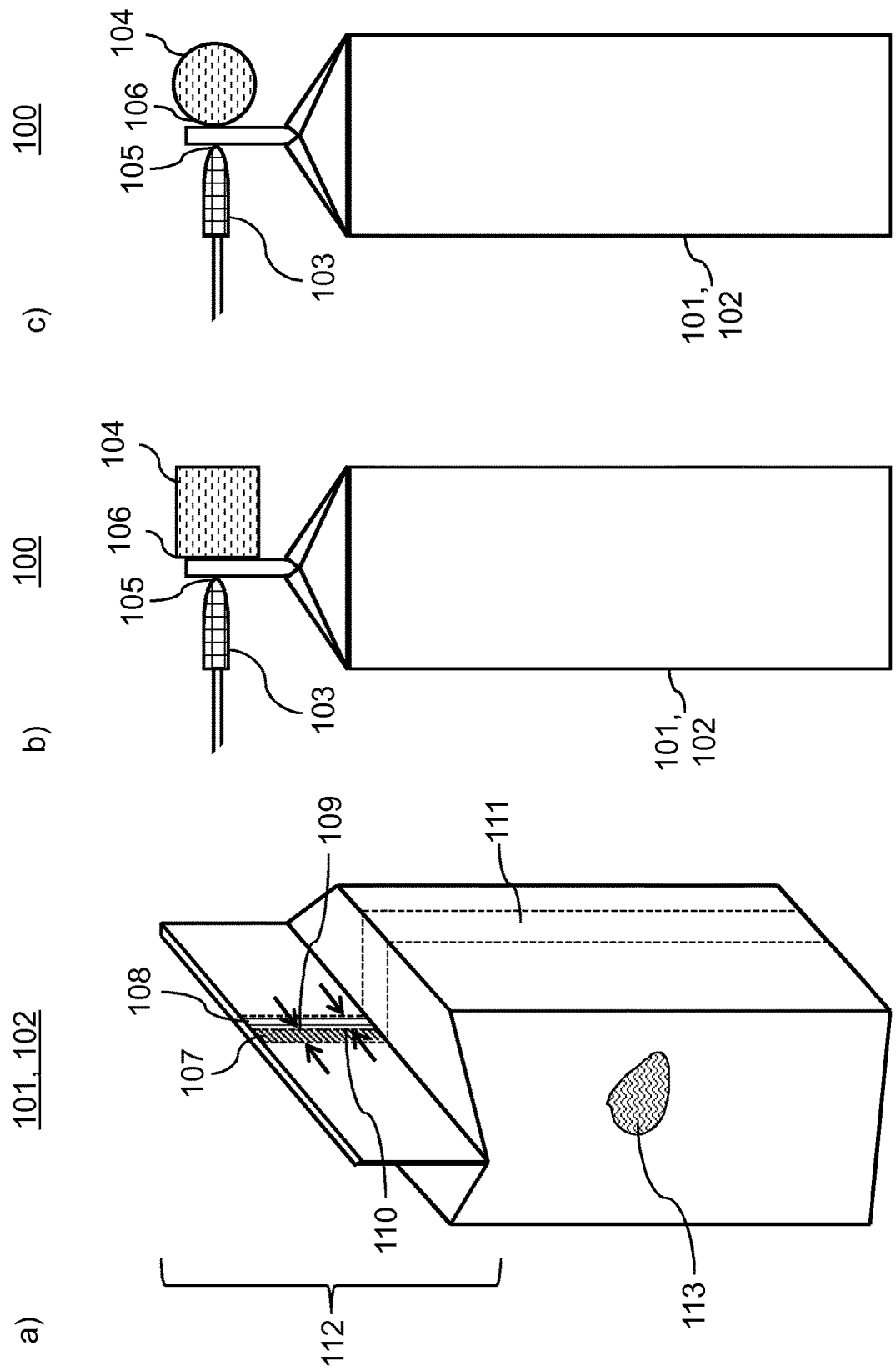
FIG. 1a) a diagram of a container precursor comprising a first composite region according to the invention and a second composite region according to the invention.
FIG. 1b) a diagram of a device according to the invention comprising a container precursor.
FIG. 1c) a diagram of a further device according to the invention comprising a container precursor.

A contribution towards fulfilling at least one of the objects according to the invention is made by an embodiment 1 of a device 1 comprising a first fixing element, a further fixing element and a folded planar composite; wherein the first fixing element comprises a first fixing surface and the further fixing element comprises a further fixing surface; wherein the folded planar composite is at least partially fixed between the first fixing surface and the further fixing surface; wherein the folded planar composite comprises a first composite region; wherein the first composite region comprises a first layer sequence comprising as layers overlapping one another in the direction from the further fixing surface to the first fixing surface a first composite layer, a second composite layer, a third composite layer and a fourth composite layer; wherein in the first composite region the second composite layer is joined to the third composite layer and the third composite layer is joined to the fourth composite layer; wherein the first composite layer comprises a first carrier layer; wherein the second composite layer comprises a second carrier layer; wherein the third composite layer comprises a third carrier layer; wherein the fourth composite layer comprises a fourth carrier layer; wherein in the first composite region the third carrier layer is characterised by a smaller layer thickness than in each case one selected from the group consisting of the first carrier layer, the second carrier layer and the fourth carrier layer or a combination of at least two of these; wherein the first fixing surface or the further fixing surface or both comprises a recess comprising a first recess region; wherein the recess has a first maximum depth in the first recess region; wherein the first composite region is located at least partially between the first recess region and the first fixing surface or the further fixing surface.

An embodiment 2 of the device 1 according to the invention is configured according to embodiment 1, wherein the folded planar composite further comprises a second composite region; wherein the second composite region comprises a second layer sequence comprising as layers overlapping one another in the direction from the further fixing surface to the first fixing surface the first composite layer, the second composite layer, the third composite layer and the fourth composite layer; wherein in the second composite region the third composite layer is joined to the fourth composite layer; wherein in the second composite region the first carrier layer or the fourth carrier layer or in each case both is characterised by a greater layer thickness than the second carrier layer or the third carrier layer or in each case both; wherein the recess further comprises a second recess region;

wherein the recess has a second maximum depth in the second recess region; wherein the first maximum depth is greater than the second maximum depth; wherein the second composite region is located at least partially between the second recess region and the first fixing surface or the further fixing surface.

An embodiment 3 according to the invention of the device 1 is configured according to embodiment 1 or 2, wherein the further fixing surface comprises the recess.

An embodiment 4 according to the invention of the device 1 is configured according to one of the preceding embodiments, wherein the first composite layer comprises as the first composite layer sequence in the direction from the further fixing surface to the first fixing surface the first carrier layer and a first barrier layer; wherein the second composite layer comprises as the second composite layer sequence in the direction from the further fixing surface to the first fixing surface a second barrier layer and the second carrier layer; wherein the third composite layer comprises as the third composite layer sequence in the direction from the further fixing surface to the first fixing surface the third carrier layer and a third barrier layer; wherein the fourth composite layer comprises as the fourth composite layer sequence in the direction from the further fixing surface to the first fixing surface a fourth barrier layer and the fourth carrier layer.

An embodiment 5 according to the invention of the device 1 is configured according to one of embodiments 2 to 4, wherein the first maximum depth is 1.1 to 5 times, preferably 1.1 to 4 times, more preferably 1.1 to 3 times, more preferably 1.1 to 2 times, more preferably 1.1 to 1.8 times, more preferably 1.1 to 1.5 times, most preferably 1.1 to 1.3 times the size of the second maximum depth.

An embodiment 6 according to the invention of the device 1 is configured according to one of embodiments 2 to 5, wherein the first composite region is adjacent to the second composite region; wherein the first recess region is adjacent to the second recess region.

An embodiment 7 according to the invention of the device 1 is configured according to one of the preceding embodiments, wherein a length of the recess in the direction of a periphery of the fixing element comprising the recess is at least 10%, preferably at least 20%, more preferably at least 25%, more preferably at least 30%, more preferably at least 50%, most preferably 100% of the periphery.

An embodiment 8 according to the invention of the device 1 is configured according to one of the preceding embodiments, wherein the first composite region is characterised by a first width; wherein the first width is in a range of from 1 to 6 mm, preferably from 1 to 5 mm, more preferably from 2 to 4 mm, most preferably from 2 to 3 mm; wherein the recess has a length perpendicular to the first width; wherein the first recess region is wider than the first width over at least 50%, preferably at least 60%, more preferably at least 70%, more preferably at least 80%, more preferably at least 90%, more preferably at least 95%, most preferably at least 100% of the length.

An embodiment 9 according to the invention of the device 1 is configured according to one of embodiments 2 to 8, wherein the second composite region is characterised by a second width; wherein the second width is in a range of from 1 to 10 mm, preferably from 1 to 8 mm, more preferably from 2 to 8 mm, more preferably from 2 to 6 mm, most preferably from 3 to 5 mm; wherein the recess has a length perpendicular to the second width; wherein the second recess region is wider than the second width over at least 50%, preferably at least 60%, more preferably at least 70%, more preferably at least 80%, more preferably at least 90%, more preferably at least 95%, most preferably at least 100% of the length.

An embodiment 10 according to the invention of the device 1 is configured according to one of the preceding embodiments, wherein the recess has a length in the direction of a periphery of the fixing element comprising the recess; wherein a width of the recess along the periphery is lower.

An embodiment 11 according to the invention of the device 1 is configured according to one of the preceding embodiments, wherein the recess is demarcated on opposite sides of the recess by a first edge and a further edge; wherein the first edge comprises a straight first edge section; wherein the further edge comprises a straight further edge section; wherein the straight first edge section and the straight further edge section enclose an angle in a range of from 5 to 30°, preferably from 5 to 25°, more preferably from 5 to 20°, most preferably from 10 to 20°.

An embodiment 12 according to the invention of the device 1 is configured according to one of the preceding embodiments, wherein the first fixing element or the further fixing element or both is a sonotrode.

An embodiment 13 according to the invention of the device 1 is configured according to embodiment 12, wherein the sonotrode is one selected from the group consisting of an alloy comprising to the extent of at least 90 wt. %, preferably at least 93 wt. %, more preferably at least 95 wt. % titanium or aluminium or both, based on the weight of the alloy; a steel; and a piezoceramic or a combination of at least two of these; preferably is made thereof. A preferred steel is a sintered steel.

An embodiment 14 according to the invention of the device 1 is configured according to one of the preceding embodiments, wherein a depth of the recess is a universally constant function from a position on a straight line which runs in the direction of a width of the recess. Preferably, the depth varies continuously and without jumps.

An embodiment 15 according to the invention of the device 1 is configured according to one of embodiments 2 to 14, wherein in a transition region the first recess region passes into the second recess region; wherein a depth of the recess in the transition region has a radius of curvature in a range of from 20 to 50 mm, preferably from 24 to 45 mm, more preferably from 27 to 40 mm, most preferably from 30 to 35 mm.

An embodiment 16 according to the invention of the device 1 is configured according to one of the preceding embodiments, wherein a depth of the first recess region at least partially has a radius of curvature in a range of from 10 to 30 mm, preferably from 12 to 28 mm, more preferably from 15 to 25 mm, most preferably from 18 to 21 mm.

An embodiment 17 according to the invention of the device 1 is configured according to one of embodiments 2 to 16, wherein a depth of the second recess region at least partially has a radius of curvature in a range of from 5 to 35 mm, preferably from 8 to 32 mm, more preferably from 10 to 28 mm, most preferably from 12 to 25 mm.

An embodiment 18 according to the invention of the device 1 is configured according to one of the preceding embodiments, wherein in the first composite region the layer thickness of the third carrier layer is in each case 0.05 to 0.9 times, preferably 0.1 to 0.85 times, more preferably 0.2 to 0.85 times, more preferably 0.3 to 0.85 times, more preferably 0.4 to 0.85 times, still more preferably 0.5 to 0.8 times, most preferably 0.6 to 0.75 times the size of the layer thickness in each case of one selected from the group consisting of the first carrier layer, the second carrier layer and the fourth carrier layer or a combination of at least two of these.

An embodiment 19 according to the invention of the device 1 is configured according to one of embodiments 2 to 18, wherein in the second composite region the layer thickness of the first carrier layer or the fourth carrier layer or of both is in each case 1.1 to 20 times, preferably 1.1 to 15 times, more preferably 1.1 to 10 times, more preferably 1.1 to 5 times, more preferably 1.1 to 3 times, more preferably 1.1 to 2 times, more preferably 1.2 to 1.9 times, still more preferably 1.2 to 1.8 times, most preferably 1.3 to 1.7 times the size of the layer thickness of the second carrier layer or the third carrier layer or both.

An embodiment 20 according to the invention of the device 1 is configured according to one of embodiments 2 to 19, wherein in the second composite region the second composite layer is not joined to the third composite layer. Preferably, the second composite layer and the third composite layer are in contact in the second composite region, but not joined. Preferably, in the second composite region at least 20%, more preferably at least 30%, more preferably at least 40%, more preferably at least 50%, more preferably at least 60%, more preferably at least 70%, still more preferably at least 80%, still more preferably at least 90%, most preferably at least 95% of a surface of the second composite layer facing the third composite layer is in contact with the third composite layer, and preferably not joined. Further preferably, the second composite layer and the third composite layer are held to one another in that they are joined to one another in at least one composite region, preferably the first composite region, adjacent to the second composite region. In a further embodiment, in the second composite region the second composite layer also is neither joined to nor in contact with the third composite layer. In a further embodiment according to the invention the second composite layer and the third composite layer in the second composite region are joined to one another, preferably on at least 20%, more preferably at least 30%, more preferably at least 40%, more preferably at least 50%, more preferably at least 60%, more preferably at least 70%, still more preferably at least 80%, still more preferably at least 90%, most preferably at least 95% of a surface of the second composite layer facing the third composite layer. The second composite layer and the third composite layer in the second composite region here are preferably pressed or sealed with one another or both.

An embodiment 21 according to the invention of the device 1 is configured according to one of embodiments 2 to 20, wherein in the second composite region a) a surface of the second carrier layer facing the third carrier layer, and
b) a surface of the third carrier layer facing the second carrier layer in each case comprises no top layer, preferably no "coat" and is joined to no top layer, preferably no "coat"

An embodiment 22 according to the invention of the device 1 is configured according to one of the preceding embodiments, wherein in the first composite region a surface of the third carrier layer facing the second carrier layer comprises no top layer, preferably no "coat", and is joined to no top layer, preferably no "coat".

An embodiment 23 according to the invention of the device 1 is configured according to one of the preceding embodiments, wherein one selected from the group consisting of the first carrier layer, the second carrier layer, the third carrier layer and the fourth carrier layer or a combination of at least two of these comprises one selected from the group consisting of cardboard, pasteboard and paper or a combination of at least two of these, preferably is made thereof.

An embodiment 24 according to the invention of the device 1 is configured according to one of embodiments 2 to 23, wherein the folded planar composite comprises a third composite region; wherein the third composite region comprises a third layer sequence comprising as layers overlapping one another in the direction from the further fixing surface to the first fixing surface the first composite layer, the second composite layer and the fourth composite layer; wherein in the third composite region the second composite layer is joined to the fourth composite layer; wherein the third composite region is adjacent to the first composite region; wherein the recess comprises a third recess region; wherein the third recess region is adjacent to the first recess region; wherein the recess has a third maximum depth in the third recess region; wherein the first maximum depth is greater than the third maximum depth; wherein the third maximum depth is greater than the second maximum depth; wherein the third composite region is located at least partially between the third recess region and the first fixing surface or the further fixing surface.

An embodiment 25 according to the invention of the device 1 is configured according to embodiment 24, wherein the first maximum depth is 1.01 to 3 times, preferably 1.01 to 2.5 times, more preferably 1.01 to 2 times, more preferably 1.01 to 1.5 times, most preferably 1.05 to 1.25 times the size of the third maximum depth.

An embodiment 26 according to the invention of the device 1 is configured according to embodiments 24 or 25, wherein the third composite region is characterised by a third width; wherein the third width is in a range of from 1 to 12 mm, preferably from 1 to 10 mm, more preferably from 1 to 8 mm, more preferably from 2 to 6 mm, more preferably from 3 to 6 mm, most preferably from 5 to 6 mm; wherein the recess has a length perpendicular to the third width; wherein the third recess region is wider than the third width over at least 50%, preferably at least 60%, more preferably at least 70%, more preferably at least 80%, more preferably at least 90%, more preferably at least 95%, most preferably at least 100% of the length.

An embodiment 27 according to the invention of the device 1 is configured according to one of the preceding embodiments, wherein the folded planar composite is a container precursor surrounding an interior.

An embodiment 28 according to the invention of the device 1 is configured according to embodiment 27, wherein the container precursor contains a foodstuff.

An embodiment 29 according to the invention of the device 1 is configured according to one of the preceding embodiments, wherein the folded planar composite is constructed in one piece.

A contribution towards fulfilling at least one of the objects according to the invention is made by an embodiment 1 of a method 1, comprising as method steps
  a) providing a folded planar composite,
    wherein the folded planar composite comprises a first composite layer, a second composite layer, a third composite layer, a fourth composite layer and a first composite region;
    wherein an intermediate region is located between the first composite layer and the second composite layer;
    wherein the first composite layer comprises a first carrier layer;
    wherein the second composite layer comprises a second carrier layer;
    wherein the third composite layer comprises a third carrier layer;
    wherein the fourth composite layer comprises a fourth carrier layer;
    wherein the first composite region comprises a first layer sequence comprising as layers overlapping one another in the direction from the intermediate region through the first layer sequence the second composite layer, the third composite layer and the fourth composite layer;
    wherein in the first composite region the second composite layer is joined to the third composite layer and the third composite layer is joined to the fourth composite layer;
    wherein in the first composite region the third carrier layer is characterised by a smaller layer thickness than in each case one selected from the group consisting of the first carrier layer, the second carrier layer and the fourth carrier layer or a combination of at least two of these;
  b) providing a first fixing element comprising a first fixing surface and a further fixing element comprising a further fixing surface;
    wherein the first fixing surface or the further fixing surface or both comprises a recess comprising a first recess region;
    wherein the recess has a first maximum depth in the first recess region;
  c) bringing into contact the fourth composite layer with the first fixing surface, the first composite layer with the further fixing surface, and the first composite layer with the second composite layer;
    wherein the first composite region is located at least partially between the first recess region and the first fixing surface or the further fixing surface;
  d) joining the first composite layer to the second composite layer.

An embodiment 2 according to the invention of the method 1 is configured according to embodiment 1, wherein in method step a) the folded planar composite further comprises a second composite region; wherein the second composite region comprises a second layer sequence comprising as layers overlapping one another in the direction from the intermediate region through the second layer sequence the second composite layer, the third composite layer and the fourth composite layer; wherein in the second composite region the third composite layer is joined to the fourth composite layer; wherein in the second composite region the first carrier layer or the fourth carrier layer or in each case both is characterised by a greater layer thickness than in each case the second carrier layer or the third carrier layer or both; wherein in method step b) the recess further comprises a second recess region; wherein the recess has a second maximum depth in the second recess region; wherein the first maximum depth is greater than the second maximum depth;

wherein in method step c) the second composite region is located at least partially between the second recess region and the first fixing surface or the further fixing surface.

An embodiment 3 according to the invention of the method 1 is configured according to embodiment 1 or 2, wherein in method step d) the first fixing surface or the further fixing surface or both vibrates against the planar composite with a) a frequency in a range of from 10 to 50 kHz, preferably from 10 to 45 kHz, more preferably from 10 to 40 kHz, more preferably from 15 to 35 kHz, most preferably from 20 to 35 kHz, or
b) an amplitude in a range of from 3 to 20 µm, preferably from 4 to 18 µm, more preferably from 5 to 16 µm, more preferably from 6 to 15 µm, most preferably from 6.5 to 13.3 µm; or
c) both.

An embodiment 4 according to the invention of the method 1 is configured according to one of embodiments 1 to 3, wherein in method step d) the joining is a sealing by a transfer of an ultrasonic vibration from the first fixing element or the further fixing element or both to the folded planar composite.

An embodiment 5 according to the invention of the method 1 is configured according to embodiment 4, wherein the ultrasonic vibration is excited for a duration in a range of from 50 to 500 ms, preferably from 70 to 460 ms, more preferably from 90 to 420 ms, more preferably from 110 to 360 ms, more preferably from 130 to 320 ms, more preferably from 150 to 280 ms, more preferably from 160 to 240 ms, most preferably from 180 to 220 ms.

An embodiment 6 according to the invention of the method 1 is configured according to one of embodiments 1 to 5, wherein in method step a) the folded planar composite is a container precursor, wherein in method step d) the joining is a closing of the container precursor.

An embodiment 7 according to the invention of the method 1 is configured according to embodiment 6, wherein before method step c) a foodstuff is introduced into the container precursor.

An embodiment 8 according to the invention of the method 1 is configured according to embodiment 6 or 7, wherein in method step d) a closed container is obtained, wherein the closed container is autoclaved.

An embodiment 9 according to the invention of the method 1 is configured according to one of embodiments 6 to 8, wherein before method step c) the container precursor is sterilised.

An embodiment 10 according to the invention of the method 1 is configured according to one of embodiments 1 to 9, wherein in method step a) the providing comprises
  i) providing a planar composite comprising
    A) a layer sequence comprising
      I) a composite carrier layer and
      II) a composite barrier layer,
    B) an edge region and
    C) an inside region adjacent to the edge region;
  ii) reducing a layer thickness of the composite carrier layer in the edge region;
  iii) producing a fold in the edge region to obtain a first edge fold region and a further edge fold region,
    wherein the first edge fold region and the further edge fold region are adjacent to one another along the fold;
  iv) bringing into contact the first edge fold region with a first part of the further edge fold region and
    joining a further part of the further edge fold region to the inside region;
  v) producing a further fold in the inside region to obtain a first composite fold region and a further composite fold region,
    wherein the further composite fold region comprises the edge region;
  vi) joining the first composite fold region to the first part of the further edge fold region and the further part of the further edge fold region.

An embodiment 11 according to the invention of the method 1 is configured according to embodiment 10, wherein in method step v) the further composite fold region comprises a part of the inside region, wherein in method step vi) the first composite fold region is further joined to the part of the inside region.

An embodiment 12 according to the invention of the method 1 is configured according to embodiment 10 or 11, wherein in method step ii) the reduction is a skiving of the composite carrier layer.

An embodiment 13 according to the invention of the method 1 is configured according to embodiment 12, wherein the skiving is carried out by a rotating tool.

An embodiment 14 according to the invention of the method 1 is configured according to one of embodiments 10 to 13, wherein in method step i) the planar composite comprises a score, wherein in method step v) the producing of the further fold comprises folding along the score.

A contribution towards fulfilling at least one of the objects according to the invention is made by an embodiment 1 of a closed container 1 obtainable by the method 1 according to one of embodiments 1 to 14.

A contribution towards fulfilling at least one of the objects according to the invention is made by an embodiment 1 of a closed container 2 surrounding an interior, wherein the closed container comprises a folded planar composite, wherein the folded planar composite comprises a first seam region and a further seam region, wherein the first seam region is joined along a seam to the further seam region, wherein the first seam region or the further seam region or both has a depression along the seam. Preferably, the first seam region has the depression along the seam. Preferably, the further seam region has no depression along the seam. A preferred depression extends longitudinally along the seam. A further preferred depression is a score or an embossing or both. Preferably, the seam crosses a longitudinal seam of the closed container and runs preferably at right angles through one selected from the group consisting of a first composite region according to the invention, a second composite region according to the invention and a third composite region according to the invention or a combination of at least two of these. Preferably, the depression has a width in a range of from 1 to 10 mm, preferably from 1 to 7 mm, more preferably from 2 to 5 mm, most preferably from 2 to 4 mm. A preferred depression has universally along the depression a depth in a range of from 0.1 to 2 mm, preferably from 0.2 to 1.5 mm, more preferably from 0.3 to 1 mm, most preferably from 0.5 to 1 mm.

An embodiment 2 according to the invention of the closed container 2 is configured according to embodiment 1, wherein the further seam region comprises a first composite layer, wherein the first seam region comprises a second composite layer, a third composite layer, a fourth composite layer and a first composite region; wherein the seam is located between the first composite layer and the second composite layer; wherein the first composite layer comprises a first carrier layer; wherein the second composite layer comprises a second carrier layer; wherein the third composite layer comprises a third carrier layer; wherein the fourth composite layer comprises a fourth carrier layer; wherein the first composite region comprises a first layer sequence comprising as layers overlapping one another in the direction from the seam through the first layer sequence the second composite layer, the third composite layer and the fourth composite layer; wherein in the first composite region the second composite layer is joined to the third composite layer and the third composite layer is joined to the fourth composite layer; wherein, with respect to the first composite region, the third carrier layer is characterised by a smaller layer thickness than in each case one selected from the group consisting of the first carrier layer, the second carrier layer and the fourth carrier layer or a combination of at least two of these.

An embodiment 3 according to the invention of the closed container 2 is configured according to embodiment 2, wherein the first seam region further comprises a second composite region; wherein the second composite region comprises a second layer sequence comprising as layers overlapping one another in the direction from the seam through the second layer sequence the second composite layer, the third composite layer and the fourth composite layer; wherein in the second composite region the third composite layer is joined to the fourth composite layer; wherein, with respect to the second composite region, the first carrier layer or the fourth carrier layer or in each case both is characterised by a greater layer thickness than the second carrier layer or the third carrier layer or in each case both.

An embodiment 4 according to the invention of the closed container 2 is configured according to embodiment 2 or 3, wherein the first seam region further comprises a third composite region; wherein the third composite region comprises a third layer sequence comprising as layers overlapping one another in the direction from the seam through the third layer sequence the first composite layer, the second composite layer and the fourth composite layer; wherein in the third composite region the second composite layer is joined to the fourth composite layer; wherein the third composite region is adjacent to the first composite region.

An embodiment 5 according to the invention of the closed container 2 is configured according to one of embodiments 1 to 4, wherein the folded planar composite surrounds the interior on all sides, wherein the folded planar composite is constructed in one piece.

An embodiment 6 according to the invention of the closed container 2 is configured according to one of embodiments 1 to 5, wherein a carrier layer of the folded planar composite comprises a hole, wherein the hole is covered at least with a barrier layer of the folded planar composite as a hole-covering layer, wherein preferably the hole is further covered by an opening aid, wherein the opening aid is constructed for opening the container in a region of the hole.

A contribution towards fulfilling at least one of the objects according to the invention is made by an embodiment 1 of a use 1 of the device according to one of embodiments 1 to 29 for a joining of the first composite layer to the second composite layer.

Preferred embodiments of constituents of the device according to the invention are likewise preferred as embodiments of constituents of the same name or corresponding constituents in the method according to the invention and in the closed container according to the invention. Furthermore, preferred embodiments of constituents used in the method according to the invention and constituents of the closed container according to the invention are similarly preferred for constituents of the same name or corresponding constituents of the device according to the invention.

Layers

Two layers are joined to one another if their adhesion to one another goes beyond van der Waals forces of attraction. Layers joined to one another are preferably one selected from the group consisting of sealed to one another, glued to one another and pressed to one another, or a combination of at least two of these. Unless stated otherwise, in a layer sequence the layers can follow one another indirectly, that is to say with one or at least two intermediate layers, or directly, that is to say without an intermediate layer. This is the case in particular in the wording where one layer overlaps another layer. A wording where a layer sequence comprises listed layers means that at least the stated layers are present in the stated sequence. This wording does not necessarily say that these layers follow one another directly. A wording where two layers are adjacent to one another says that these two layers follow one another directly and therefore without an intermediate layer. However, this wording says nothing about whether or not the two layers are joined to one another. Rather, these two layers can be in contact with one another.

Joining

A preferred joining is one selected from the group consisting of a sealing, a gluing and a pressing, or a combination of at least two of these. In the case of sealing, the join is created by means of a liquid and solidification thereof. In the case of gluing, chemical bonds which create the join form between the boundary faces or surfaces of the two objects to be joined. In the case of sealing or gluing, it is often advantageous for the surfaces to be sealed or glued to be pressed together with one another. A preferred pressing of two layers is pressing on to one another in each case of a first surface of the first of the two layers on to a second surface of the second of the two layers facing the first surface over at least 20%, preferably at least 30%, more preferably at least 40%, more preferably 50%, more preferably at least 60%, more preferably at least 70%, still more preferably at least 80%, still more preferably at least 90%, most preferably at least 95% of the first surface. A particularly preferred joining is a sealing. A preferred sealing comprises as steps a laying on one another, a heating and a pressing, wherein the steps are preferably carried out in this sequence. Another sequence is likewise conceivable, in particular the sequence of heating, laying on one another and pressing. A preferred heating is a heating of a polymer layer, preferably a thermoplastic layer, more preferably a polyethylene layer or a polypropylene layer or both. A further preferred heating is a heating of a polyethylene layer to a temperature in a range of from 80 to 140° C., more preferably from 90 to 130° C., most preferably from 100 to 120° C. A further preferred heating is a heating of a polypropylene layer to a temperature in a range of from 120 to 200° C., more preferably from 130 to 180° C., most preferably from 140 to 170° C. A further preferred heating is carried out to a sealing temperature of the polymer layer. A preferred heating can be carried out by radiation, by hot gas, by thermal contact with a solid, by mechanical vibrations, preferably by ultrasound, by convection or by a combination of at least two of these measures. A particularly preferred heating is carried out by excitation of an ultrasonic vibration.

Bringing into Contact

A preferred bringing into contact is pressing on one another.

Top Layer

A preferred top layer is a "coat". A "coat" in papermaking is a top layer which comprises inorganic solid particles, preferably pigments and additives. The "coat" is preferably applied as a liquid phase, preferably as a suspension or dispersion, to a surface of a layer containing paper or cardboard. A preferred dispersion is an aqueous dispersion. A preferred suspension is an aqueous suspension. A further preferred liquid phase comprises inorganic solid particles, preferably pigments; a binder; and additives. A preferred pigment is selected from the group consisting of calcium carbonate, kaolin, talc, silicate, a plastics pigment and titanium dioxide. A preferred kaolin is a calcined kaolin. A preferred calcium carbonate is one selected from the group consisting of marble, chalk and a precipitated calcium carbonate (PCC) or a combination of at least two of these. A preferred silicate is a laminar silicate. A preferred plastics pigment is in bead form, preferably hollow bead form. A preferred binder is one selected from the group consisting of styrene/butadiene, acrylate, acrylonitrile, a starch and a polyvinyl alcohol or a combination of at least two of these, acrylate being preferred. A preferred starch is one selected from the group consisting of cationically modified, anionically modified and fragmented or a combination of at least two of these. A preferred additive is one selected from the group consisting of a rheology modifier, a nuancing dyestuff, an optical brightener, a carrier for an optical brightener, a flocculating agent, a deaerating agent and a surface energy modifier or a combination of at least two of these. A preferred deaerating agent is a brush paint deaerating agent, preferably based on silicon or based on fatty acids or both. A preferred surface energy modifier is a surfactant.

Carrier Layer

As the carrier layer, any material which is suitable for this purpose to the person skilled in the art and which has an adequate strength and rigidity to give the container according to the invention or a container made of the planar composite according to the invention stability to the extent that in the filled state the container substantially retains its shape can be employed. In addition to a number of plastics, plant-based fibrous substances, in particular celluloses, preferably sized, bleached and/or non-bleached celluloses, are preferred, paper and cardboard being particularly preferred. The weight per unit area of a carrier layer, preferably each carrier layer, is preferably in a range of from 120 to 450 g/m$^2$, particularly preferably in a range of from 130 to 400 g/m$^2$ and most preferably in a range of from 150 to 380 g/m$^2$. A preferred cardboard as a rule has a single- or multilayered structure and can be coated on one or both sides with one or also more top layers. A preferred cardboard furthermore has a residual moisture content of less than 20 wt. %, preferably from 2 to 15 wt. % and particularly preferably from 4 to 10 wt. %, based on the total weight of the cardboard. A particularly preferred cardboard has a multilayered structure. The cardboard furthermore preferably has at least one, but particularly preferably at least two layers of a top layer, which is known to the person skilled in the art as "coat", on the surface facing the environment. A preferred to cardboard furthermore preferably has a Scott bond value in a range of from 100 to 360 J/m$^2$, preferably from 120 to 350 J/m$^2$ and particularly preferably from 135 to 310 J/m$^2$. By the above-mentioned ranges, it is possible to provide a composite from which a container of high leakproofness can be folded easily and in low tolerances. A preferred carrier layer comprises on at least one surface, preferably on two opposite surfaces, in each case a top layer. Preferably, each carrier layer comprises on each surface, if this is not expressly ruled out, a top layer. Most preferably, each carrier layer comprises no top layer only on one skived surface optionally present. Preferably, the first carrier layer and the second carrier layer are constructed in one piece. More preferably, the first carrier layer and the second carrier layer and the third carrier layer are constructed in one piece. Still more preferably, the first carrier layer and the second carrier layer and the third carrier layer and the fourth carrier layer are constructed in one piece. Most preferably, all the carrier layers are constructed in one piece.

Barrier Layer

As the barrier layer, any material which is suitable for this purpose to the person skilled in the art and has an adequate barrier action, in particular against oxygen, can be employed. The barrier layer is preferably selected from a. a barrier layer of plastic;
b. a metal layer;
c. a metal oxide layer; or
d. a combination of at least two of a. to c.

If the barrier layer according to alternative a. is a barrier layer of plastic, this preferably comprises at least 70 wt. %, particularly preferably at least 80 wt. % and most preferably at least 95 wt. % of at least one plastic which is known to the person skilled in the art for this purpose, in particular because of aroma or gas barrier properties which are suitable for packaging containers. Possible plastics, in particular thermoplastics, here are N- or O-carrying plastics, both by themselves and in mixtures of two or more. According to the invention, it may prove advantageous if the barrier layer of plastic has a melting temperature in a range of from more than 155 to 300° C., preferably in a range of from 160 to 280° C. and particularly preferably in a range of from 170 to 270° C.

Further preferably, the barrier layer of plastic has a weight per unit area in a range of from 2 to 120 g/m$^2$, preferably in a range of from 3 to 60 g/m$^2$, particularly preferably in a range of from 4 to 40 g/m$^2$ and moreover preferably from 6 to 30 g/m$^2$. Furthermore preferably, the barrier layer of plastic is obtainable from melts, for example by extrusion, in particular laminating extrusion. Moreover preferably, the barrier layer of plastic can also be introduced into the planar composite via lamination. It is preferable here for a film to be incorporated into the planar composite. According to another embodiment barrier layers of plastic which are obtainable by deposition from a solution or dispersion of plastics can also be selected.

Possible suitable polymers are preferably those which have a weight-average molecular weight, determined by gel permeation chromatography (GPC) by means of light scattering, in a range of from $3 \cdot 10^3$ to $1 \cdot 10^7$ g/mol, preferably in a range of from $5 \cdot 10^3$ to $1 \cdot 10^6$ g/mol and particularly preferably in a range of from $6 \cdot 10^3$ to $1 \cdot 10^5$ g/mol. Possible suitable polymers are, in particular, polyamide (PA) or polyethylene/vinyl alcohol (EVOH) or a mixture thereof.

Among the polyamides, all PA which seem suitable for the use according to the invention to the person skilled in the art are possible. PA 6, PA 6.6, PA 6.10, PA 6.12, PA 11 or PA 12 or a mixture of at least two of these are to be mentioned here in particular, PA 6 and PA 6.6 being particularly preferred and PA 6 being further preferred. PA 6 is commercially obtainable, for example, under the trade names Akulon®, Durethan® and Ultramid®. Amorphous polyamides, such as e.g. MXD6, Grivory® and Selar® PA, are moreover suitable. It is further preferable for the PA to have a density in a range of from 1.01 to 1.40 g/cm³, preferably in a range of from 1.05 to 1.30 g/cm³ and particularly preferably in a range of from 1.08 to 1.25 g/cm³. Furthermore, it is preferable for the PA to have an intrinsic viscosity in a range of from 130 to 185 ml/g and preferably in a range of from 140 to 180 ml/g.

As EVOH, all EVOH which seem suitable for the use according to the invention to the person skilled in the art are possible. Examples of these are, inter alia, commercially obtainable in a large number of different configurations under the trade name EVAL™ from EVAL Europe NV, Belgium, for example the types EVAL™ F104B or EVAL™ LR171B. Preferred EVOH have at least one, two, several or all of the following properties:
- an ethylene content in a range of from 20 to 60 mol %, preferably from 25 to 45 mol %;
- a density in a range of from 1.0 to 1.4 g/cm³, preferably from 1.1 to 1.3 g/cm³;
- a melting point in a range of from more than 155 to 235° C., preferably from 165 to 225° C.;
- an MFR value (210° C./2.16 kg if $T_{M(EVOH)}$<230° C.; 230° C./2.16 kg if 210° C.<$T_{M(EVOH)}$<230° C.) in a range of from 1 to 25 g/10 min, preferably from 2 to 20 g/10 min;
- an oxygen permeation rate in a range of from 0.05 to 3.2 cm³·20 µm/m²·day·atm, preferably in a range of from 0.1 to 1 cm³·20 µm/m²·day·atm.

According to alternative b. the barrier layer is a metal layer. All layers with metals which are known to the person skilled in the art and can create a high impermeability to light and oxygen are suitable in principle as the metal layer. According to a preferred embodiment the metal layer can be present as a foil or as a deposited layer, e.g. formed by a physical gas phase deposition. The metal layer is preferably an uninterrupted layer. According to a further preferred embodiment the metal layer has a thickness in a range of from 3 to 20 µm, preferably a range of from 3.5 to 12 µm and particularly preferably in a range of from 4 to 10 µm.

Metals which are preferably selected are aluminium, iron or copper. A steel layer, e.g. in the form of a foil, may be preferred as an iron layer. Furthermore preferably, the metal layer is a layer with aluminium. The aluminium layer can expediently be made of an aluminium alloy, for example AlFeMn, AlFe1.5Mn, AlFeSi or AlFeSiMn. The purity is conventionally 97.5% and higher, preferably 98.5% and higher, in each case based on the total aluminium layer. In a particular embodiment the metal layer is made of an aluminium foil. Suitable aluminium foils have an extensibility of more than 1%, preferably of more than 1.3% and particularly preferably of more than 1.5%, and a tensile strength of more than 30 N/mm², preferably more than 40 N/mm² and particularly preferably more than 50 N/mm². Suitable aluminium foils show a drop size of more than 3 mm, preferably more than 4 mm and particularly preferably of more than 5 mm in the pipette test. Suitable alloys for establishing aluminium layers or foils are commercially obtainable under the designations EN AW 1200, EN AW 8079 or EN AW 8111 from Hydro Aluminium Deutschland GmbH or Amcor Flexibles Singen GmbH.

In the case of a metal foil as the barrier layer, an adhesion promoter layer can be provided between the metal foil and a next polymer layer on one and/or both sides of the metal foil. According to a particular embodiment of the container according to the invention, however, an adhesion promoter is provided between the metal foil and the next polymer layer on no side of the metal foil.

Furthermore preferably, a metal oxide layer can be selected as the barrier layer according to alternative c. Possible metal oxide layers are all metal oxide layers which are familiar and seem suitable to the person skilled in the art for achieving a barrier action against light, vapour and/or gas. Metal oxide layers based on the metals aluminium, iron or copper already mentioned above and those metal oxide layers based on titanium or silicon oxide compounds are preferred in particular. A metal oxide layer is produced, by way of example, by vapour deposition of a metal oxide on a layer of plastic, for example an orientated polypropylene film. A preferred process for this is physical gas phase deposition.

According to a further preferred embodiment the metal layer or metal oxide layer can be present as a laminated composite of one or more layers of plastic with a metal layer. Such a layer is obtainable, for example, by vapour deposition of a metal on a layer of plastic, for example an orientated polypropylene film. A preferred process for this is physical gas phase deposition.

Preferably, the first barrier layer and the second barrier layer are constructed in one piece. More preferably, the first barrier layer and the second barrier layer and the third barrier layer are constructed in one piece. Still more preferably, the first barrier layer and the second barrier layer and the third barrier layer and the fourth barrier layer are constructed in one piece. Most preferably, all the barrier layers are constructed in one piece.

Polymer Layers

Preferably, in each case a polymer layer is located between the first carrier layer and the first barrier layer, likewise preferably between the second carrier layer and the second barrier layer, likewise preferably the third carrier layer and the third barrier layer, likewise preferably the fourth carrier layer and the fourth barrier layer. Furthermore preferably, the first barrier layer is overlapped by a polymer layer, preferably joined to the polymer layer, on one side facing away from the first carrier layer. Furthermore preferably, the second barrier layer is overlapped by a polymer layer, preferably joined to the polymer layer, on one side facing away from the second carrier layer. Furthermore preferably, the third barrier layer is overlapped by a polymer layer, preferably joined to the polymer layer, on one side facing away from the third carrier layer. Furthermore preferably, the fourth barrier layer is overlapped by a polymer layer, preferably joined to the polymer layer, on one side facing away from the fourth carrier layer. Further preferably, the first carrier layer is overlapped by a polymer layer, preferably joined to the polymer layer, on one side facing away from the first barrier layer. Further preferably, the second carrier layer is overlapped by a polymer layer, preferably joined to the polymer layer, on one side facing away from the second barrier layer, wherein the second carrier layer is preferably not joined to the polymer layer and not overlapped by the polymer layer in the second composite region on the side facing away from the second barrier layer. Further preferably, the third carrier layer is overlapped by a polymer layer, preferably joined to the polymer layer, on one side facing away from the third barrier layer, wherein the third carrier layer is preferably not joined to the polymer layer and not overlapped by the polymer layer in the first composite region, the second composite region and the third composite region on the side facing away from the third barrier layer. Further preferably, the fourth carrier layer is overlapped by a polymer layer, preferably joined to the polymer layer, on one side facing away from the fourth barrier layer.

Each polymer layer can have further constituents. These polymer layers are preferably incorporated into or applied to the layer sequence in an extrusion process. The further constituents of the polymer layers are preferably constituents which do not adversely influence the properties of the polymer melt during application as a layer. The further constituents can be, for example, inorganic compounds, such as metal salts, or further plastics, such as further thermoplastics. However, it is also conceivable for the further constituents to be fillers or pigments, for example carbon black or metal oxides. Possible suitable thermoplastics for the further constituents are in particular those which can be easily processed due to good extrusion properties. Among these, polymers obtained by chain polymerization are suitable, in particular polyesters or polyolefins, where cyclic olefin copolymers (COC), polycyclic olefin copolymers (POC), in particular polyethylene and polypropylene, are particularly preferred and polyethylene is very particularly preferred. Among the polyethylenes, HDPE, MDPE, LDPE, LLDPE, VLDPE and PE and mixtures of at least two of these are preferred. Mixtures of at least two thermoplastics can also be employed. Suitable polymer layers have a melt flow rate (MFR) in a range of from 1 to 25 g/10 min, preferably in a range of from 2 to 20 g/10 min and particularly preferably in a range of from 2.5 to 15 g/10 min, and a density in a range of from 0.890 g/cm$^3$ to 0.980 g/cm$^3$, preferably in a range of from 0.895 g/cm$^3$ to 0.975 g/cm$^3$, and further preferably in a range of from 0.900 g/cm$^3$ to 0.970 g/cm$^3$. The polymer layers preferably have at least one melting temperature in a range of from 80 to 155° C., preferably in a range of from 90 to 145° C. and particularly preferably in a range of from 95 to 135° C. A preferred polymer layer is a polyolefin layer, preferably a polyethylene layer or a polypropylene layer or both.

Polyolefin

A preferred polyolefin is a polyethylene or a polypropylene or both. A preferred polyethylene is one selected from the group consisting of an LDPE, an LLDPE and an HDPE or a combination of at least two of these. A preferred polyolefin is an m-polyolefin. Suitable polyethylenes have a melt flow rate (MFR) in a range of from 1 to 25 g/10 min, preferably in a range of from 2 to 20 g/10 min and particularly preferably in a range of from 2.5 to 15 g/10 min, and a density in a range of from 0.910 g/cm$^3$ to 0.935 g/cm$^3$, preferably in a range of from 0.912 g/cm$^3$ to 0.932 g/cm$^3$, and further preferably in a range of from 0.915 g/cm$^3$ to 0.930 g/cm$^3$.

m-Polyolefin

An m-polyolefin is a polyolefin which has been produced by means of a metallocene catalyst. A metallocene is an organometallic compound in which a central metal atom is arranged between two organic ligands, such as, for example, cyclopentadienyl ligands. A preferred m-polyolefin is an m-polyethylene or an m-polypropylene or both. A preferred m-polyethylene is one selected from the group consisting of an mLDPE, an mLLDPE and an mHDPE or a combination of at least two of these.

Melting Temperatures

A preferred m-polyolefin is characterised by at least a first melting temperature and a second melting temperature. Preferably, the m-polyolefin is characterised by a third melting temperature in addition to the first and the second melting temperature. A preferred first melting temperature is in a range of from 84 to 108° C., preferably from 89 to 103° C., more preferably from 94 to 98° C. A preferred further melting temperature is in a range of from 100 to 124° C., preferably from 105 to 119° C., more preferably from 110 to 114° C.

Adhesion/Adhesion Promoter Layer

An adhesion promoter layer can be located between layers of the planar composite which are not directly adjacent to one another. In particular, in each case an adhesion promoter layer can be located between each nth barrier layer and a polymer layer which overlaps the nth barrier layer on one side facing away from the nth carrier layer, wherein n is an integer from the range of from 1 to 4.

Possible adhesion promoters in an adhesion promoter layer are all plastics which, due to functionalization by means of suitable functional groups, are suitable for producing a firm join by the formation of ionic bonds or covalent bonds to a surface of a particular adjacent layer. Preferably, these are functionalized polyolefins which have been obtained by copolymerization of ethylene with acrylic acids, such as acrylic acid, methacrylic acid, crotonic acid, acrylates, acrylate derivatives or carboxylic acid anhydrides carrying double bonds, for example maleic anhydride, or at least two of these. Among these, polyethylene-maleic anhydride graft polymers (EMAH), ethylene/acrylic acid copolymers (EAA) or ethylene/methacrylic acid copolymers (EMAA), which are marketed, for example, under the trade names Bynel® and Nucrel® 0609HSA by DuPont or Escor® 6000ExCo by ExxonMobil Chemicals, are preferred.

According to the invention it is preferable for the adhesion between a carrier layer, a polymer layer or a barrier layer and the particular next layer to be at least 0.5 N/15 mm, preferably at least 0.7 N/15 mm and particularly preferably at least 0.8 N/15 mm. In one embodiment according to the invention it is preferable for the adhesion between a polymer layer and a carrier layer to be at least 0.3 N/15 mm, preferably at least 0.5 N/15 mm and particularly preferably at least 0.7 N/15 mm. It is furthermore preferable for the adhesion between a barrier layer and a polymer layer to be at least 0.8 N/15 mm, preferably at least 1.0 N/15 mm and particularly preferably at least 1.4 N/15 mm. In the case where a barrier layer indirectly follows a polymer layer via an adhesion promoter layer, it is preferable for the adhesion between the barrier layer and the adhesion promoter layer to be at least 1.8 N/15 mm, preferably at least 2.2 N/15 mm and particularly preferably at least 2.8 N/15 mm. In a particular embodiment the adhesion between the individual layers is so strong in construction that in the adhesion test tearing of a carrier layer, and in the case of a cardboard as the carrier layer a so-called tearing of the cardboard fibre, occurs.

In One Piece

Two layers are constructed in one piece if there is a transition region in which the two layers are adjacent to one another and pass into one another without an intermediate layer and without a joining element. A preferred transition region is a fold region. A fold region comprises a fold. A preferred fold runs along a score. Layers constructed in one piece have preferably been produced together as one piece from raw materials and have not been joined to one another after this production. Layers constructed in one piece preferably have the same composition or the same build-up or both. In one embodiment of the invention it is preferable for at least one layer, preferably all the layers, of the composite in each case to be constructed as such in one piece. It is equally preferable for layers of the same name of different composite regions to be constructed in each case as such in one piece via at least two of these different composite regions.

Container Precursor

A preferred container precursor is in the form of a jacket or tubular or both. A container precursor in the form of a jacket is preferably characterised in that its outer surface corresponds to a geometric jacket surface. A tubular container precursor is preferably a semi-continuous tube structure having in each case an opening at opposite ends of the tube.

Container

The closed container according to the invention can have a large number of different forms, but a substantially parallelepipedal structure is preferred. The container can furthermore be formed over its complete surface from a planar composite, or can have a 2- or multi-part structure. In the case of a multi-part structure, it is conceivable that in addition to the planar composite, other materials can also be employed, for example plastic material, which can be employed in particular in the head or base regions of the container. However, it is preferable here for the container to be built up from the planar composite to the extent of at least 50%, particularly preferably to the extent of at least 70% and moreover preferably to the extent of at least 90% of the surface. Furthermore, the container can have a device for emptying the contents. This can be formed, for example, from plastic material and attached to the outside of the container. It is also conceivable that this device is integrated into the container by direct injection moulding. According to a preferred embodiment the container according to the invention has at least one, preferably from 4 to 22 or also more edges, particularly preferably from 7 to 12 edges. In the context of the present invention, edge is understood as meaning regions which are formed on folding a surface. Edges which may be mentioned by way of example are the longitudinal contact regions of in each case two wall surfaces of the container. In the container, the container walls preferably represent the surfaces of the container framed by the edges. Preferably, the closed container comprises no base which is not constructed in one piece with the planar composite or no lid which is not constructed in one piece with the planar composite or both.

Skiving

Skiving is a method step known to the person skilled in the art for reducing a layer thickness of a layer, preferably a carrier layer, more preferably a carrier layer of one selected from the groups consisting of cardboard, pasteboard and paper or a combination of at least two of these. The skiving is preferably carried out with a material-removing tool, preferably with a skiving tool or a splitting tool or both. A further preferred material-removing tool is a rotating tool. A most preferred rotating tool is a blade, preferably a cup blade, or a milling tool or both. A further preferred material-removing tool is a blade, preferably a rotating blade, most preferably a cup blade, or a milling tool or both.

Folding the Planar Composite

It is preferable for the folding to be carried out in a temperature range of from 10 to 50° C., preferably in a range of from 15 to 45° C. and particularly preferably in a range of from 20 to 40° C. of the folded region of the planar composite. This can be achieved by the planar composite having a temperature in the above ranges. It is furthermore preferable for a folding tool, preferably together with the planar composite, to have a temperature in the above range. For this, the folding tool has no heating. Rather, the folding tool or also the planar composite or both can be cooled. It is furthermore preferable for the folding to be carried out at a temperature of at most 50° C. as "cold folding" and for the joining to be carried out at above 50° C., preferably above 80° C. and particularly preferably above 120° C. as "heat sealing". The above conditions and in particular temperatures preferably also apply in the folding environment, for example in the housing of the folding tool. It is further preferable for the cold folding or the cold folding in combination with the heat sealing to be applied at angles µ which form during folding of less than 100°, preferably less than 90°, particularly preferably less than 70° and moreover preferably less than 50°. The angle µ is formed by two adjacent fold surfaces.

According to the invention, in this context "folding" is understood as meaning an operation in which preferably a longitudinal crease forming an angle is produced in the folded planar composite by means of a folding edge of a folding tool. For this, two adjacent surfaces of a planar composite are often bent ever more towards one another. By the folding, at least two adjacent fold surfaces are formed, which can then be joined at least in part regions to form a container region. According to the invention the joining can be carried out by any measure which appears to be suitable to the person skilled in the art and which renders possible a join which is as gas- and liquid-tight as possible.

It is further preferable for the fold surfaces to form an angle µ of less than 90°, preferably of less than 45° and particularly preferably of less than 20°. The fold surfaces are often folded to the extent that these come to lie on one another at the end of the folding. This is advantageous in particular if the fold surfaces lying on one another are subsequently joined to one another in order to form the container base and the container head, which is often configured gable-like or also flat. Regarding the gable configuration, reference may be made by way of example to WO 90/09926 A2.

Longitudinal Seam

Preferably, the first composite region and the second composite region and preferably also the third composite region belong to a longitudinal seam of a container precursor or of the closed container. Preferably, the first composite region and the second composite region and preferably also the third composite region form a longitudinal seam of a container precursor or of the closed container. Preferably, the device according to the invention is constructed such that a container precursor can be closed by sealing, sealing being carried out via the longitudinal seam of the container precursor. During the sealing a thickened side of the longitudinal seam is preferably not in the recess, but precisely adjacent to the other fixing to surface opposite the recess.

Foodstuffs

Possible foodstuffs are all the foodstuffs for human consumption and also animal feeds known to the person skilled in the art. Preferred foodstuffs are liquid above 5° C., for example dairy products, soups, sauces and non-carbonated drinks. The filling of the container or the container precursor can be carried out in various ways. On the one hand, the foodstuff and the container or the container precursor can be sterilized separately, before the filling, to the greatest degree possible by suitable measures, such as treatment of the container or the container precursor with $H_2O_2$, UV radiation or other suitable high-energy radiation, plasma treatment or a combination of at least two of these, as well as heating of the foodstuff, and the container or the container precursor is then filled. This type of filling is often called "aseptic filling" and is preferred according to the invention. In addition to or also instead of the aseptic filling, it is furthermore a widespread procedure to heat the container or the container precursor, which has been filled with foodstuff and closed, to reduce the germ count. This is preferably carried out by pasteurization or autoclaving. Less sterile foodstuffs and containers or container precursors can also be employed in this procedure.

Hole/Opening Aid

In order to facilitate the ease of opening of the closed container according to the invention, a carrier layer can have at least one hole. In a particular embodiment the hole is covered at least with a barrier layer and preferably a polymer layer, as hole-covering layers. Furthermore, one or more further layers, in particular adhesion promoter layers, can be provided between the layers already mentioned. It is preferable here for the hole-covering layers to be joined to one another at least partially, preferably to the extent of at least 30%, preferably at least 70% and particularly preferably to the extent of at least 90% of the area formed by the hole. According to a particular embodiment it is preferable for the hole to penetrate through the entire planar composite and to be covered by a closure or opening device which closes the hole. In connection with a preferred embodiment the hole provided in the carrier layer can have any form which is known to the person skilled in the art and is suitable for various closures, drinking straws or opening aids. The opening of a closed container is usually carried out by at least partial destruction of the hole-covering layers covering the hole. This destruction can be effected by cutting, pressing into the container or pulling out of the container. The destruction can be effected by an openable closure joined to the container and arranged in the region of the hole, usually above the hole, or a drinking straw which is pushed through the hole-covering layers covering the hole.

According to a further preferred embodiment a carrier layer of the planar composite has a plurality of holes in the form of a perforation, wherein the individual holes are covered at least with a barrier layer, and preferably a polymer layer, as hole-covering layers. A container produced from such a composite can then be opened by tearing along the perforation. Such holes for perforations are preferably produced by means of a laser. The use of laser beams is particularly preferred if a metal foil or a metallized film is employed as the barrier layer. It is furthermore possible for the perforation to be introduced by mechanical perforation tools, usually having blades.

According to a further preferred embodiment the planar composite is subjected to a heat treatment at least in the region of the at least one hole. In the case of several holes present in the carrier layer in the form of a perforation it is particularly preferable for this heat treatment also to be carried out around the edge region of the hole. The heat treatment can be carried out by radiation, by hot gas, by thermal contact with a solid, by mechanical vibrations, preferably by ultrasound, or by a combination of at least two of these measures. Particularly preferably, the heat treatment is carried out by irradiation, preferably electromagnetic radiation and particularly preferably electromagnetic induction or also by hot gas. The particular optimum operating parameters to be chosen are known to the person skilled in the art.

Irradiation

In the case of irradiation, any type of radiation which is suitable to the person skilled in the art for softening the polymer layers present is possible. Preferred types of radiation are IR rays, UV rays and microwaves. In the case of IR rays, which are also employed for IR welding of planar composites, wavelength ranges of from 0.7 to 5 µm are to be mentioned. Furthermore, laser beams can be employed in a wavelength range of from 0.6 to less than 1.6 µm. In connection with the use of IR rays, these are generated by various suitable lamps which are known to the person skilled in the art. Short wavelength lamps in the range of from 1 to 1.6 µm are preferably halogen lamps. Medium wavelength lamps in the range of from >1.6 to 3.5 µm are, for example, metal foil lamps. Quartz lamps are often employed as long wavelength lamps in the range of >3.5 µm. Lasers are ever more often employed. Thus, diode lasers are employed in a wavelength range of from 0.8 to 1 µm, Nd:YAG lasers at about 1 µm and $CO_2$ lasers at about 10.6 µm. High frequency techniques with a frequency range of from 10 to 45 MHz, often in a power range of from 0.1 to 100 kW, are also employed.

Ultrasound

In the case of ultrasound, the following treatment parameters are preferred:

P1 a frequency in a range of from 5 to 100 kHz, preferably in a range of from 10 to 50 kHz and particularly preferably in a range of from 15 to 40 kHz;

P2 an amplitude in the range of from 2 to 100 µm, preferably in a range of from 5 to 70 µm and particularly preferably in a range of from 10 to 50 µm;

P3 a vibration time (as the period of time in which a vibrating body, such as a sonotrode or inductor, acts in contact vibration on the planar composite) in a range of from 50 to 1,000 ms, preferably in a range of from 100 to 600 ms and particularly preferably in a range of from 150 to 300 ms.

For a suitable choice of the radiation or vibration conditions, it is advantageous to take into account the intrinsic resonances of the plastics and to select frequencies close to these.

Contact with a Solid

Heating via contact with a solid can be effected, for example, by a heating plate or heating mould which is in direct contact with the planar composite and releases the heat to the planar composite.

Hot Gas

The hot gas, preferably hot air, can be directed on to the planar composite by suitable fans, outlets or nozzles or a combination thereof. Contact heating and hot gas are often employed simultaneously. Thus, for example, a holding device which holds a tube formed from the planar composite and through which hot gas flows, and which is thereby heated up and releases the hot gas through suitable openings, can heat the planar composite by contact with the wall of the holding device and the hot gas. Furthermore, the tube can also be heated by fixing the tube with a tube holder and directing a flow from one or two and more hot gas nozzles provided in the jacket holder on to the regions of the tube which are to be heated.

Fixing Element

The first fixing element and the further fixing element are constructed such that the planar composite can be fixed, preferably clamped, at least partially between the first fixing surface and the further fixing surface. For this the first fixing element or the further fixing element or both can be prism-shaped, where the prism can have a rectangular or trapezoidal base area. In the case of the prism-shaped fixing element, the corresponding fixing surface is preferably a side surface of the prism, which represents a part of a generated surface of the prism. Furthermore, the first fixing element or the further fixing element or both can be constructed as a circular tube. In the case of a circular tube as the fixing element the corresponding fixing surface is a part of the generated surface of the circular tube. Preferably, at least one of the two fixing surfaces, preferably the first fixing surface, is flat in construction. Preferably, at least one of the two fixing surfaces, preferably the further fixing surface, is flat in construction outside the recess. The first fixing element is preferably knife-like or blade-like or both in construction. The knife edge here comprises precisely the first fixing surface. In this context the cutting edge is not knife-sharp, but blunt in construction. The first fixing element should be able to press or squeeze the planar composite by exerting pressure, but not cut it. The terms knife-like and blade-like rather are intended to indicate the flat form of the fixing element. Preferably, the fixing elements extend longitudinally to the extent that several planar composites according to the invention can be fixed according to the invention side by side between the fixing elements. For this, at least one of the fixing elements has several, preferably identical recesses according to the invention. Preferably, the fixing element comprising the recesses is constructed as a bar.

Preferably, the recess is a groove. A preferred groove is a recess which extends longitudinally, preferably produced by milling. Preferably, the recess comprises two edges of the fixing element. Preferably, the first recess region is constructed such that during pressing of the first composite region between the first recess region and the further fixing element no damage occurs, preferably no squeezing, to the first composite region. Preferably, the second recess region is constructed such that during pressing of the second composite region between the second recess region and the further fixing element no damage occurs, preferably no squeezing, to the second composite region. Furthermore preferably, the third recess region is constructed such that during pressing of the third composite region between the third recess region and the further fixing element no damage occurs, preferably no squeezing, to the third composite region. Damage here can be, in particular, burning due to introduction of too much heat.

Preferably, the first fixing element or the further fixing element, more preferably the first fixing element, is constructed as a vibrating body, preferably a sonotrode, in order to vibrate at a high frequency, preferably in the ultrasonic range, and to excite a vibration in the planar composite. By excitation of ultrasonic vibration the heating of the planar composite necessary for sealing preferably takes place. Preferably only the layers of the planar composite are heated here to a temperature above their particular melting temperature, which is intended to contribute towards creating a sealing join of previously non-joined layers. Preferably, the first fixing element or the further fixing element, more preferably the further fixing element, is an anvil to the sonotrode. Preferably, the fixing element which does not comprise the recess is the sonotrode.

A periphery of a fixing element is a periphery perpendicular to a direction along which the fixing element extends longitudinally. In the case of a prism-shaped fixing element the periphery of the fixing element is precisely the periphery of a base area of the prism. In the case of a circular tube as the fixing element the periphery of the fixing element is precisely the periphery of the circular tube.

Seam

A seam is a spatial region in which at least two seam regions are joined to one another. A seam region here is a partial region of a surface or a layer or both extending along the seam. The seam region is thus adjacent to the seam. If two layers or layer sequences are joined to one another along the seam, a partial region of the one layer or layer sequence along the seam is the first seam region and a partial region of the other layer or layer sequence along the seam is the further seam region. A preferred seam is a sealing seam. In the case of a sealing seam, the seam is the spatial region in which the sealing material was melted and now joins the two surfaces or layers or both to one another. A preferred seam is gas- and liquid-tight. A preferred seam is a head seam. A head seam is a seam of the closed container which closes the container in its head or gable region.

Sterilising

Sterilising designates a treatment of a product, preferably a container or a foodstuff or both, for reducing a germ count on or in the product. Sterilising can be carried out, for example, by the action of heat or by contact with a chemical. The chemical in this context can be gaseous or liquid or both. A preferred chemical is hydrogen peroxide.

Autoclaving

Autoclaving designates a treatment of a product, usually a filled and closed container, wherein the product is located in a pressure chamber and is heated to a temperature above 100° C., preferably between 100 and 140° C. Furthermore, the chamber pressure in the pressure chamber is above 1 bar, preferably above 1.1 bar, more preferably above 1.2 bar, more preferably above 1.3 bar and up to 4 bar. Further preferably, the autoclaving is carried out under contact of the product with water vapour.

Pasteurising

Pasteurising or pasteurisation designates brief heating of liquid or paste-like foodstuffs to temperatures up to 100° C. to kill microorganisms. It serves to keep, inter alia, milk, fruit and vegetable juices and liquid ice storable.

Measurement Methods

The following measurement methods were used in the context of the invention. Unless stated otherwise, the measurements were carried out at an ambient temperature of 25° C., an ambient air pressure of 100 kPa (0.986 atm) and a relative atmospheric humidity of 50%.

MFR Value

The MFR value is measured in accordance with the standard ISO 1133 (unless stated otherwise at 190° C. and 2.16 kg).

Density

The density is measured in accordance with the standard ISO 1183-1.

Melting Temperature

The melting temperature is determined with the aid of the DSC method ISO 11357-1, -5. The equipment is calibrated according to the manufacturer's instructions with the aid of the following measurements:
  Temperature indium onset temperature,
  Heat of melting indium,
  Temperature zinc onset temperature.

Oxygen Permeation Rate

The oxygen permeation rate is determined in accordance with the standard ISO 14663-2 annex C at 20° C. and 65% relative atmospheric humidity.

Moisture Content of the Cardboard

The moisture content of the cardboard is measured in accordance with the standard ISO 287:2009.

Adhesion

For determination of the adhesion of two adjacent layers, these are fixed on a rotatable roll on a 90° peel test apparatus, for example German rotating wheel fixture from Instron, which rotates at 40 mm/min during the measurement. The samples were cut into 15 mm wide strips beforehand. On one side of the sample the layers are detached from one another and the detached end is clamped into a tensioning device directed perpendicularly upwards. A measuring apparatus for determining the tensile force is attached to the tensioning device. On rotation of the roll, the force necessary to separate the layers from one another is measured. This force corresponds to the adhesion of the layers to one another and is stated in N/15 mm. The separation of the individual layers can be carried out, for example, mechanically, or by a targeted pretreatment, for example by softening the sample for 3 min in 60° C. hot 30% strength acetic acid.

Layer Thickness

A sample approx. 2.5 to 3.0 cm×1.0 to 1.5 cm in size is removed from the composite material to be investigated. The long side of the sample should be at right angles to the running direction of the extrusion and the fibre direction of the cardboard. The sample is fixed in a metal clamp which forms a smooth surface. The projection of the sample should be not more than 2 to 3 mm. The metal clamp is fixed before cutting. In order to obtain a clean cut, in particular of the cardboard fibres, the part of the sample projecting out of the metal clamp is frozen with refrigerating spray. This part is then removed by means of a disposable blade (Leica, Microtome Blades). The fixing of the sample in the metal clamp is now loosened such that the sample can be pushed approx. 3 to 4 mm out of the metal clamp. It is then fixed again. For the investigation under an optical microscope (Nicon Eclipse E800), the sample in the sample holder is placed on the object table of the optical microscope under one of the lenses (magnification X2.5; X5; X10; X20; X50). The appropriate lens should be selected according to the layer thickness of the region to be investigated. The precise centering is achieved under the microscope. In most cases illumination from the side (swan-neck lamps) serves as the light source. If necessary the reflected light illumination of the optical microscope is used in addition or as a substitute. Under optimum focusing and illumination of the sample, the individual layers of the composite should be detectable. An Olympus camera (Olympus DP 71) with appropriate image processing software (analySIS) for analysis is used for documentation and measurements. The layer thickness of the individual layers is also determined with this.

Molecular Weight Distribution

The molecular weight distribution is measured by gel permeation chromatography by means of light scattering: ISO 16014-3/-5.

Intrinsic Viscosity of PA:

The intrinsic viscosity of PA is measured in accordance with the standard ISO 307 in 95% sulphuric acid.

Leakproofness

Crystal oil 60 from Shell Chemicals with methylene blue is used as the test agent for the leakproofness testing. For the leakproofness test 500 containers are produced, the container precursors being filled with water before closing. The closed containers are then cut open along the periphery of the container such that a separated sealed head region is obtained. This is filled with approx. 20 ml of the test agent and stored for 3 hours. On the outside of the head region it is then tested whether the test agent has produced blue discolorations there in the event of leaking of the sealing.

The invention is described in more detail in the following by examples and drawings, where the examples and drawings do not mean a limitation of the invention.

For the examples (according to the invention) and comparative examples (not according to the invention) laminates having the following layered structure and layer sequence were produced by a laminating extrusion process.

|  | Weight per unit area | Index |
|---|---|---|
| LDPE | 15 g/m$^2$ | (3) |
| Carrier layer | 240 g/cm$^2$ | (2) |
| LDPE | 18 g/m$^2$ | (3) |
| Barrier layer | 6 μm | (1) |
| Adhesion promoter | 4 g/m$^2$ | (5) |
| LDPE | 22 g/m$^2$ | (3) |
| mPE blend | 10 g/m$^2$ | (4) |

In detail here, according to the above indices:
(1) Aluminium, EN AW 8079, thickness=6 μm from Hydro Aluminium Deutschland GmbH
(2) Cardboard: Stora Enso Natura T Duplex Doppelstrich, Scott bond 200 J/m$^2$, residual moisture content 7.5%
(3) LDPE 19N430 from Ineos GmbH, Cologne
(4) mPE blend: 35 wt. % of Affinity® PT 1451G1 from Dow Chemicals and 65 wt. % of LDPE 19N430 from Ineos GmbH, Cologne
(5) Escor 6000 HSC Exxonmobil For each example (according to the invention) and for each comparative example (not according to the invention) jacket-like container precursors and containers therefrom were produced as follows:

Comparative Example 1

Figure 15:
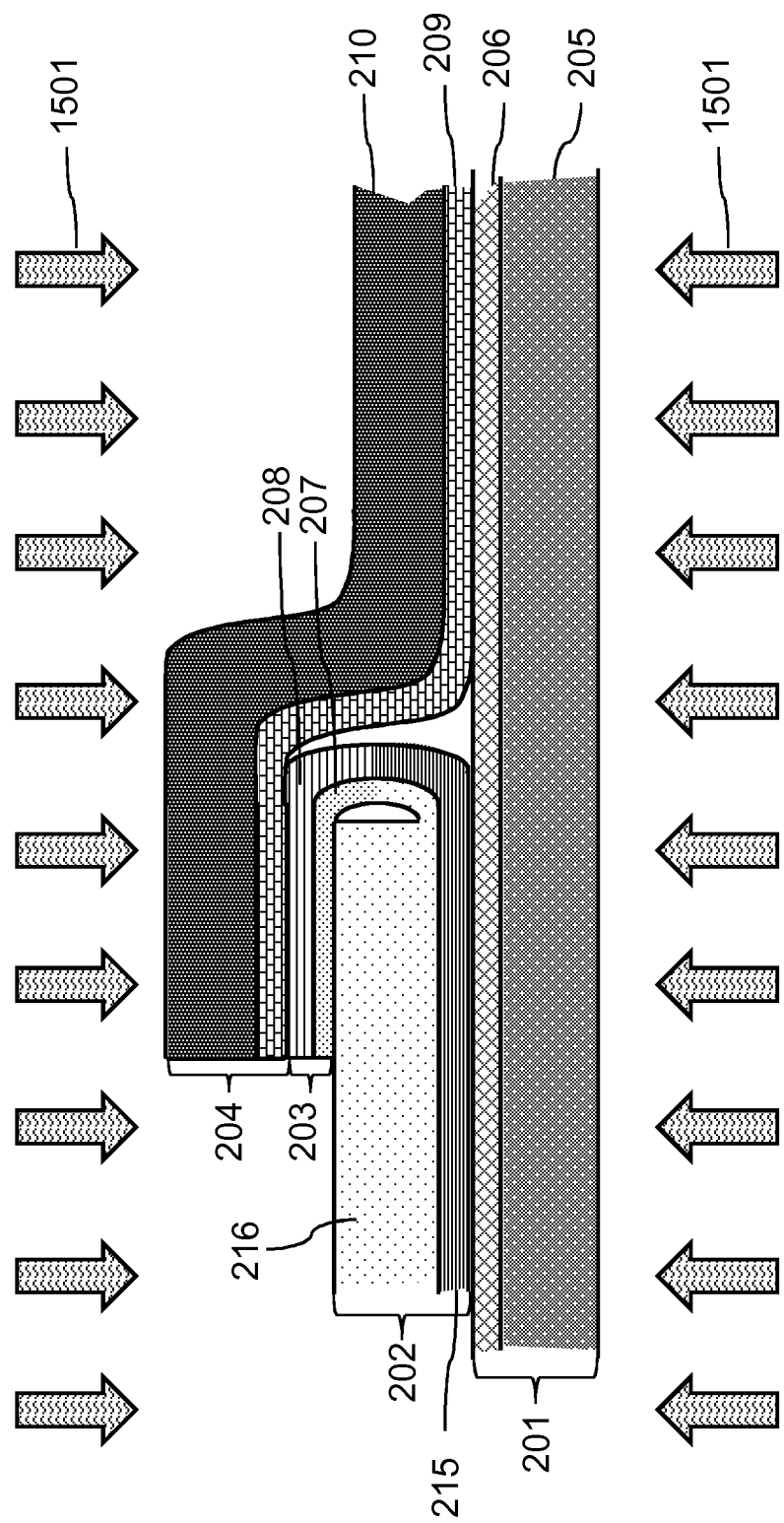
FIG. 15 a diagram of a cross-section of an arrangement, which is not according to the invention, for sealing a head region of a container precursor.

An edge of the laminate was first prepared as follows. In an edge region adjacent to the edge the outermost LDPE layer was completely and the carrier layer partially skived. By this means the outermost LDPE layer was removed and the layer thickness of the carrier layer was reduced by 80% of its non-skived layer thickness, which is 430 μm. Skiving was carried out with a rotating cup blade (skiver tool model VN 50 from Fortuna Spezialmaschinen GmbH, Weil der Stadt, Germany). The skived region was then folded completely over the adjacent non-skived region of the laminate and joined by sealing with the outermost LDPE layer of the non-skived region. A jacket-like container precursor in which the edge prepared as above is the edge of the longitudinal seam facing inwards in the container precursor was subsequently produced by folding analogously to FIG. 11e). The regions to be sealed for the longitudinal seam were furthermore laid on one another such that the edge of the laminate which was laid on the prepared edge was closed off flush exactly with the skived region laid around the non-skived region. At all event the edge laid on top does not project over the skived region to the non-skived region. FIG. 15 illustrates this. The longitudinal seam was sealed by bringing into contact the regions to be joined, heating to the sealing temperature of the mPE blend and pressing the regions to be joined. Heating was carried out here by blowing on hot air. The base region of the container precursor was produced by folding and closed by sealing with hot air. A head region was likewise produced by folding and closed by sealing with hot air. FIG. 15 shows a diagram of the arrangement according to which sealing of the head region was carried out.

Comparative Example 2

Figure 16:
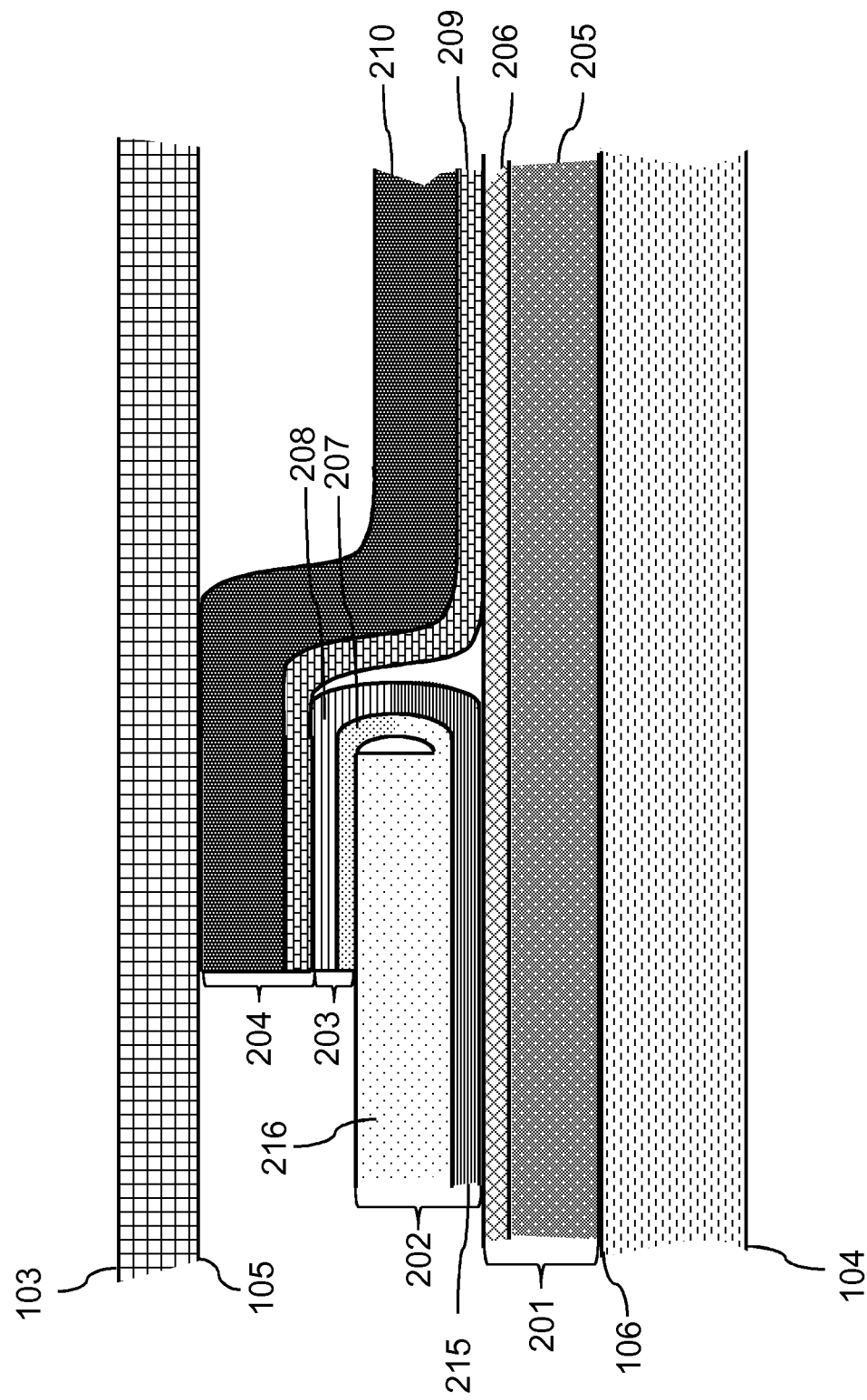
FIG. 16 a diagram of a cross-section of a further arrangement, which is not according to the invention, for sealing a head region of a container precursor.

The container precursors according to Comparative Example 2, which is not according to the invention, were produced as for Comparative Example 2, which is not according to the invention. However, closing of the head region was carried out by sealing with ultrasound. For this the regions to be sealed, one of which comprises a part of the longitudinal seam, were pressed between an ultrasound sonotrode and an anvil. The contact surfaces of the sonotrode and of the anvil were flat in construction here. FIG. 16 shows a diagram of the arrangement in cross-section.

Example 1

Figure 17:
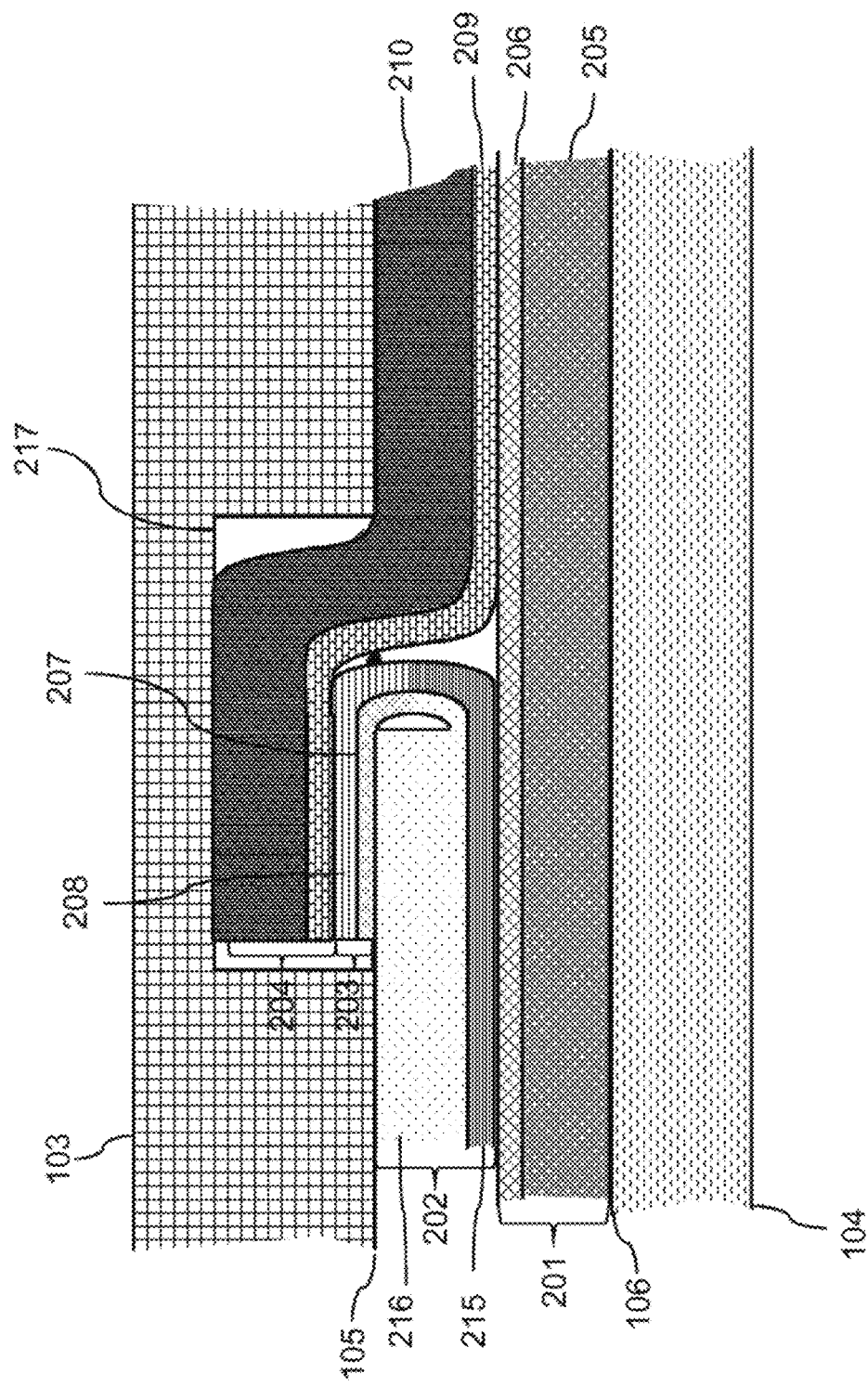
FIG. 17 a diagram of a cross-section of an arrangement according to the invention for sealing a head region of a container precursor.

Example 1 according to the invention was carried out in the same way as Comparative Example 2, but in deviation from this the anvil, which during the ultrasonic sealing was arranged on the side of the thickening of the laminate due to the longitudinal seam with the prepared edge, had a recess for the thickening. The recess had a constant depth over its entire extent, which could receive the thickening. FIG. 17 shows a diagram of the arrangement in cross-section.

Example 2

Figure 18:
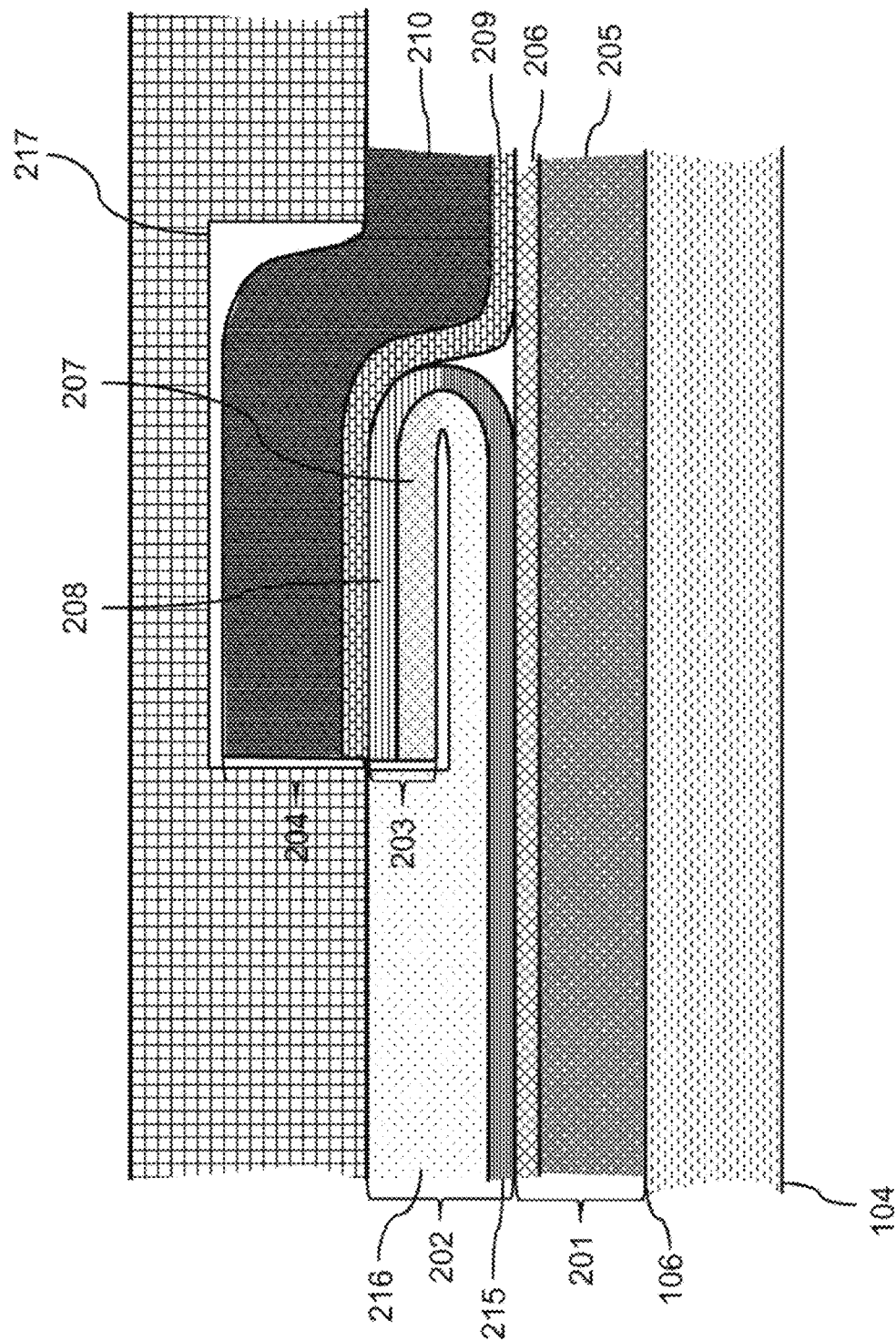
FIG. 18 a diagram of a cross-section of a further arrangement according to the invention for sealing a head region of a container precursor.

Example 2 according to the invention was carried out in the same way as Example 1, but the edge of the laminate was prepared differently. The thickness of the carrier layer during skiving was first reduced only by 50% of its original thickness, which is 430 µm. Further, a fold was produced in the skived edge region such that the skived edge region could be laid around along the fold so that it came to lie completely on itself. The skived region was thus not laid on the non-skived region. By this means with less skiving a somewhat lesser thickening of the longitudinal seam was achieved. The constant depth of the recess in the anvil was adapted thereto. FIG. 18 shows a diagram of the arrangement in cross-section.

Example 3

Figure 19:
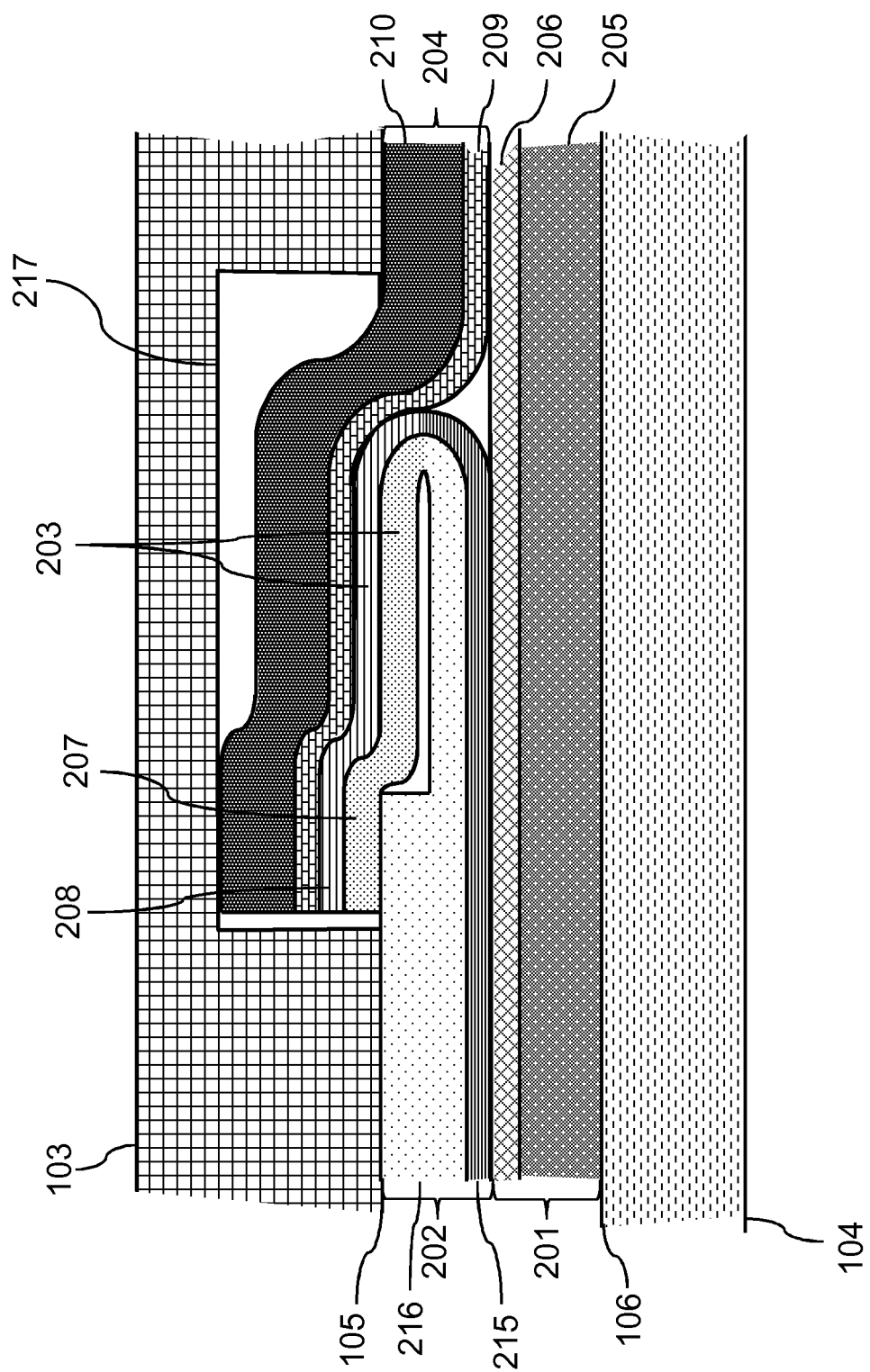
FIG. 19 a diagram of a cross-section of a further arrangement according to the invention for sealing a head region of a container precursor.

Example 3 according to the invention was carried out in the same way as Example 2, preparing of the edge again deviating. Skiving was carried out as in Example 2. However, the skived region was folded such that it could not be laid around completely on itself, but on itself and partially on the non-skived region. The constant depth of the recess in the anvil was adapted in turn to the changed thickening of the longitudinal seam. In addition, the recess was again arranged on the side of the thickening. FIG. 19 shows a diagram of the arrangement in cross-section.

Example 4

Figure 3:
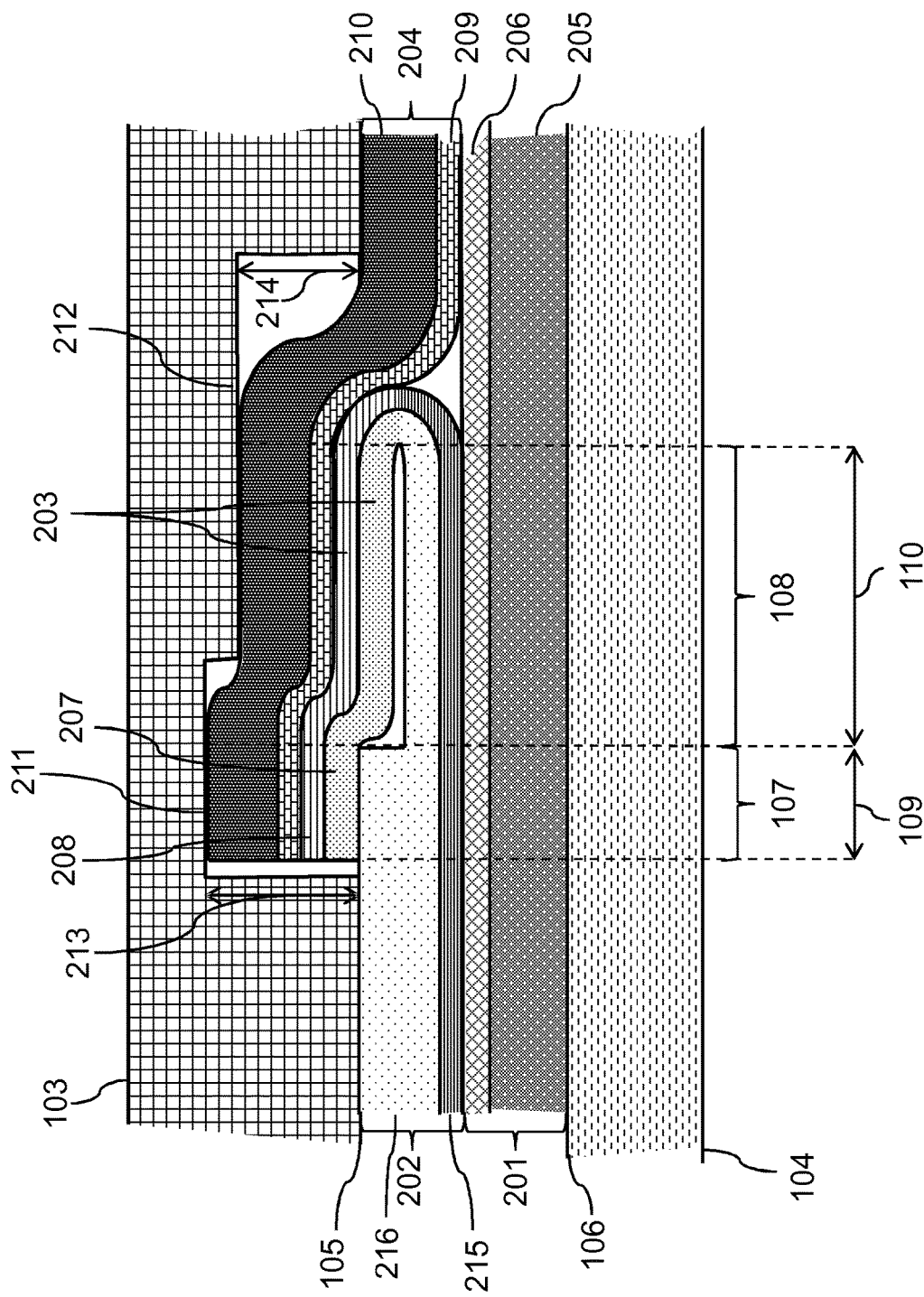
FIG. 3 a diagram of a cross-section of a further device according to the invention.

Example 4 according to the invention was carried out in the same way as Example 3, but the recess of the anvil was configured differently. The thickening of the longitudinal seam comprised regions of different thickness in this example (as also already in Example 3). For adaptation to this, the recess of the anvil in Example 4 had 2 regions of different depth. FIG. 3 shows a diagram of the arrangement in cross-section.

Example 5

Figure 2:
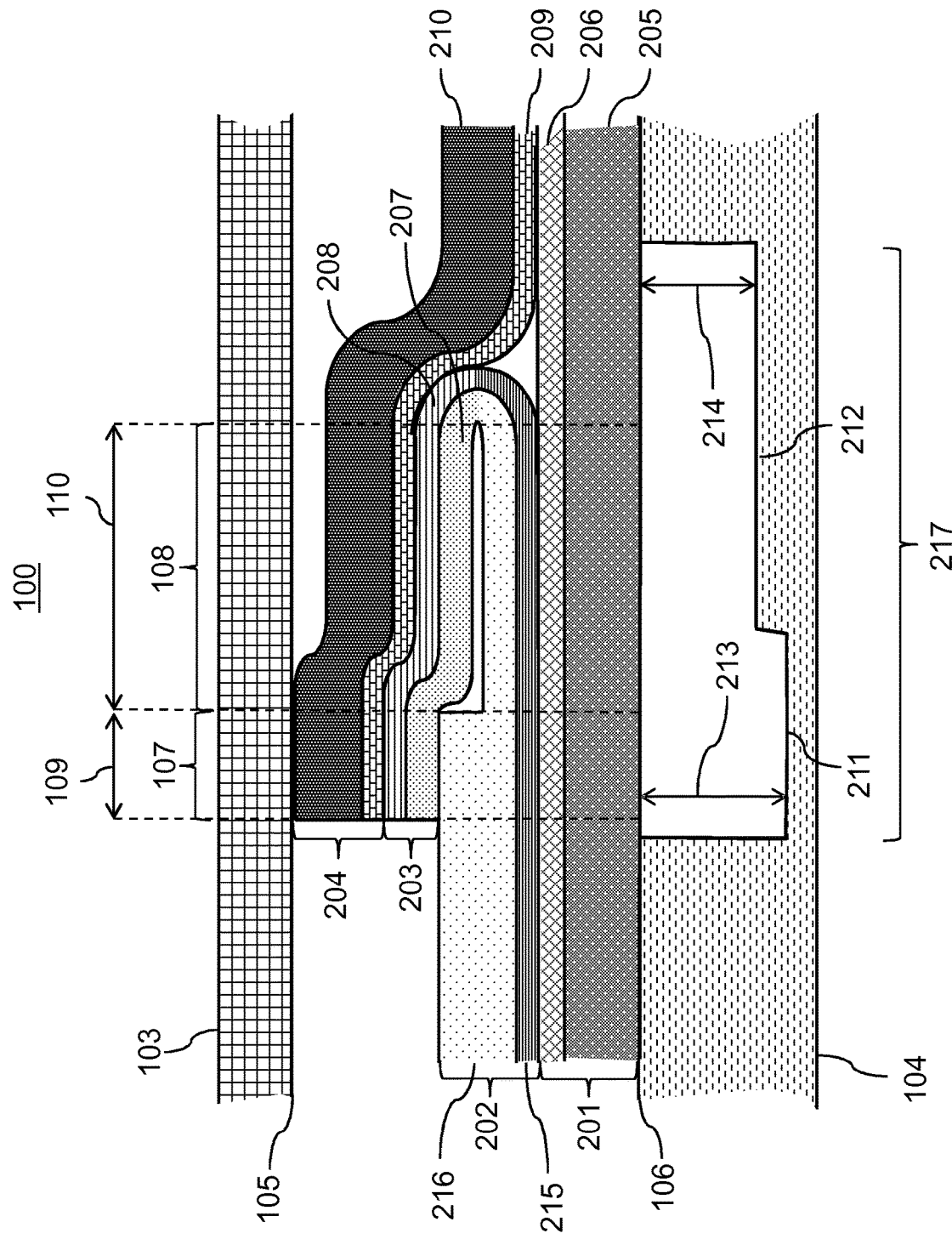
FIG. 2 a diagram of a cross-section of a device according to the invention.

Example 5 according to the invention was carried out in the same way as Example 4, but in the ultrasonic sealing arrangement here the anvil and sonotrode were interchanged. The anvil with the recess with the 2 regions of different depth accordingly was completely unintuitively not arranged on the side of the thickening. FIG. 2 shows a diagram of the arrangement in cross-section.

Example 6

Figure 5:
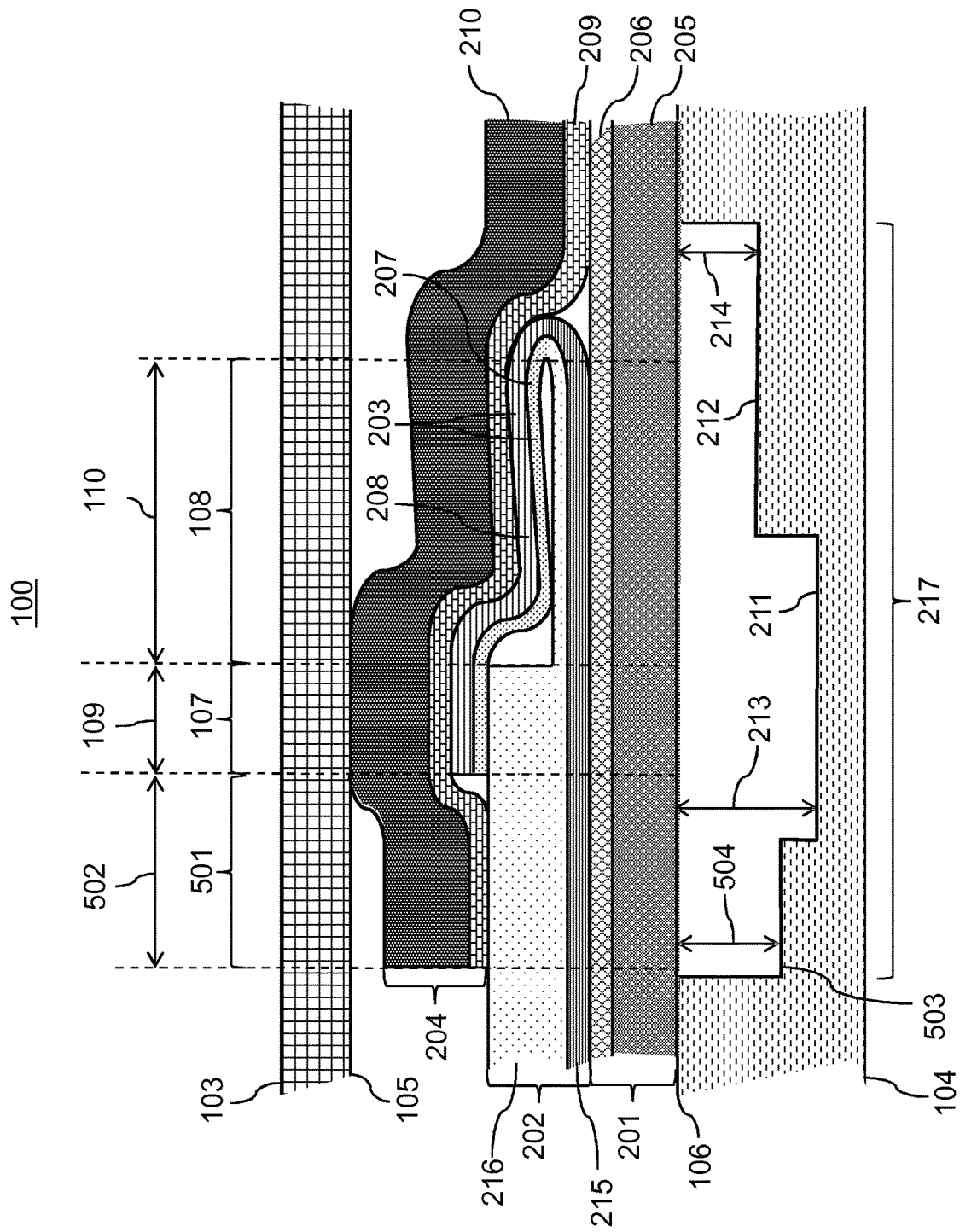
FIG. 5 a diagram of a cross-section of a further device according to the invention.

Example 6 according to the invention was carried out in the same way as Example 5, but the procedure for producing the longitudinal seam deviated. The regions to be sealed to produce the longitudinal seam were laid on one another such that the edge of the laminate which was laid on the prepared edge was extended beyond the skived edge to the non-skived region. The edge laid on top here accordingly did not close off, as in the other examples and comparative examples, flush with the skived edge laid around. The thickening as a result comprises 3 regions of different thickness. The recess in the anvil comprises 3 regions of different depth adapted thereto. FIG. 5 shows a diagram of the arrangement for sealing the top region with ultrasound in cross-section.

The process procedure influences the process speed and the process stability in industrial production. It has thus been found that in the production of the container precursors according to Comparative Examples 1 and 2 and Example 1 low process speeds are obtained compared with Examples 2 to 6. The examples according to the invention furthermore show significantly lower contents of leaking head seams than the comparative examples. Overall, the results for Example 6 are the most advantageous. Table 1 below shows an overview of this.

TABLE 1

Percentage content of leaking sealing seams according to the leakproofness method as a function of the sealing method, the position of the recess and the number of recess regions; and the average process speed in the production of the container precursors

|  | Sealing method for closing the head region | Side of the arrangement of the recess | Number of regions of different depth in the recess | Content of leaking sealing seams in the head region [%] | Average process speed [m/min] |
|---|---|---|---|---|---|
| Comparative Example 1 | hot air | / | / | 100 | 100 |
| Comparative Example 2 | ultrasound | / | / | 87 | 100 |
| Example 1 | ultrasound | thickening | 1 | 46 | 100 |
| Example 2 | ultrasound | thickening | 1 | 0 | 450 |
| Example 3 | ultrasound | thickening | 1 | 39 | 550 |
| Example 4 | ultrasound | thickening | 2 | 4 | 550 |
| Example 5 | ultrasound | opposite the thickening | 2 | 0 | 550 |
| Example 6 | ultrasound | opposite the thickening | 3 | 0 | 570 |

FIG. 1a) shows a diagram of a container precursor 102. This comprises a folded planar composite 101 which is a constituent of a device 100 according to the invention in FIG. 1b). Furthermore the container precursor 102 surrounds an interior 113, which contains a foodstuff. In a head region 112, also called gable region, the container precursor 102 comprises a first composite region 107 and a second composite region 108. The first composite region 107 has a first width 109 of 2 mm. The second composite region 108 has a second width 110 of 4 mm. The first composite region 107 and the second composite region 108 are included in a longitudinal seam 111 of the container precursor 102. The longitudinal seam 111 extends over an entire length of the container precursor 102. Along the longitudinal seam 111 opposite ends of the folded planar composite 101 are joined to one another in order thus to form the container precursor 102. Furthermore, the container precursor 102 comprises a closed base region. By closing the head region 112 using the device 100 according to the invention in FIG. 1b), a closed container 1200 (see FIG. 12) according to the invention can be produced from the container precursor 102.

FIG. 1b) shows a diagram of a device 100 according to the invention comprising the container precursor 102 in FIG. 1a). In addition to the container precursor 102 from the folded planar composite 101, the device 100 further comprises a first fixing element 103 and a further fixing element 104. The first fixing element 103 is a sonotrode made of a titanium alloy. The further fixing element 104 is an anvil for the sonotrode. The planar composite 101 is clamped in the head region 112 of the container precursor 102 between a first fixing surface 105 of the sonotrode and a further fixing surface 106 of the anvil and is thus fixed. The anvil is constructed as a prism-shaped bar with a square base area, wherein the bar extends longitudinally perpendicularly to the plane of the diagram. The further fixing surface 106 is accordingly flat in construction. The sonotrode is constructed blade-like, wherein a blunt "knife edge" of the "blade" is the first fixing surface 105.

FIG. 1c) shows a diagram of a further device 100 according to the invention comprising a container precursor 102. The device 100 in FIG. 1c) is identical to the device 100 in FIG. 1b), apart from the fact that in FIG. 1c) the further fixing element 104 is constructed as a circular tube. The further fixing surface 106 accordingly is not flat, but is constructed as part of a generated surface of the circular tube. The circular tube extends longitudinally in the direction perpendicular to the plane of the diagram.

FIG. 2 shows a diagram of a cross-section of the device 100 according to the invention from FIG. 1b). FIG. 2 shows in cross-section the region in the head region 112 of the planar composite 101 which is fixed between the first fixing surface 105 of the sonotrode and the further fixing surface 106 of the anvil. The folded planar composite 101 comprises, as shown in FIG. 1a), a first composite region 107 and a second composite region 108, both of which are included in the longitudinal seam 111 of the container precursor 102 in FIG. 1a). The first composite region 107 comprises a first layer sequence comprising as layers overlapping one another in the direction from the further fixing surface 106 to the first fixing surface 105 a first composite layer 201, a second composite layer 202, a third composite layer 203 and a fourth composite layer 204. The first composite layer 201 comprises as the first composite layer sequence in the direction from the further fixing surface 106 to the first fixing surface 105 a first polyethylene layer (not shown), a first carrier layer 205, a second polyethylene layer (not shown), a first barrier layer 206 and a third polyethylene layer. The second composite layer 202 comprises as the second composite layer sequence in the direction from the further fixing surface 106 to the first fixing surface 105 a first polyethylene layer (not shown), a second barrier layer 215, a second polyethylene layer (not shown) and a second carrier layer 216. In the first composite region 107 the second composite layer 202 further comprises a third polyethylene layer (not shown), which overlaps the second carrier layer 216 on one side facing away from the second barrier layer 215. The third composite layer 203 comprises as the third composite layer sequence in the direction from the further fixing surface 106 to the first fixing surface 105 a third carrier layer 207, a first polyethylene layer (not shown), a third barrier layer 208 and a second polyethylene layer (not shown). The fourth composite layer 204 comprises as the fourth composite layer sequence in the direction from the further fixing surface 106 to the first fixing surface 105 a first polyethylene layer (not shown), a fourth barrier layer 209, a second polyethylene layer (not shown), a fourth carrier layer 210 and a third polyethylene layer (not shown). In the first composite region 107 the second composite layer 202 and the third composite layer 203 are joined to one another by sealing of the third polyethylene layer of the second composite layer 202. Furthermore, the third composite layer 203 is joined to the fourth composite layer 204 by sealing of the second polyethylene layer of the third composite layer 203 and the first polyethylene layer of the fourth composite layer 204. In the first composite region the third carrier layer 207 is characterised by a layer thickness which is smaller by a factor of 0.7 than in each case the first carrier layer 205, the second carrier layer 216 and the fourth carrier layer 210. The second composite region 108 comprises a second layer sequence comprising as layers overlapping one another in the direction from the further fixing surface 106 to the first fixing surface 105 the first composite layer 201, the second composite layer 202, the third composite layer 203 and the fourth composite layer 204. In the second composite region 108 the third composite layer 203 is joined to the fourth composite layer 204 by sealing of the second polyethylene layer of the third composite layer 203 and the first polyethylene layer of the fourth composite layer 204. In the second composite region 108 in each case the first carrier layer 205 and the fourth carrier layer 210 are characterised by a layer thickness which is greater by a factor of 1.43 than in each case the second carrier layer 216 and the third carrier layer 207. The second composite layer 202 and the third composite layer 203 are neither joined to one another nor in contact with one another in the second composite region 108. Between these two layers there is a hollow space and no further layer of the planar composite 101. The second composite layer 202 passes into the third composite 203 at the fold point shown in FIG. 2. In the first composite region 107 and in the second composite region 108 the four composite layers 201, 202, 203 and 204, however, do not pass into one another in such a way but as described above form a layer sequence in each composite region 107, 108. In the first composite region 107 the third carrier layer 207 is skived, but not the second carrier layer 216. In the second composite region 108 the second carrier layer 216 and the third carrier layer 207 are skived. All the barrier layers 206, 215, 208, 209 occurring in FIG. 2 are made of aluminium EN A W 8079 from Hydro Aluminium Deutschland GmbH. These barrier layers 206, 215, 208, 209 in each case have a layer thickness of 6 µm and are constructed in one piece with one another. These barrier layers 206, 215, 208, 209 belong to the planar composite 101 and in each case pass into one another at folds. For the second barrier layer 215 and the third barrier layer 208 this is shown with the fold in FIG. 2. Similarly, all the carrier layers 205, 216, 207, 210 occurring in FIG. 2 are constructed in one piece with one another. These carrier layers 205, 216, 207, 210 belong to the planar composite 101 and in each case pass into one another at folds. For the second carrier layer 216 and the third carrier layer 207 this is shown with the fold in FIG. 2. Further folds of the planar composite 101 are not shown in FIG. 2, but can be seen from FIG. 1a). For production of the container precursor 102 in FIG. 1a), a carrier material (Stora Enso Natura T Duplex Doppelstrich from Stora Enso Oyj A G, Scott bond value of 200 J/m$^2$, residual moisture content 7.5%) with in each case a "coat" on both carrier sides was used. Both layer surfaces of each carrier layer 205, 216, 207, 210 in FIG. 2 accordingly in principle comprise a "coat". However, skived layer surfaces comprise no "coat". The layer surface of the second carrier layer 216 facing the third carrier layer 207 thus comprises no "coat" in the second composite region 108. In the first composite region 107 the layer surface of the second carrier layer 216 facing the third carrier layer 207 comprises a "coat". In the first composite region 107 as in the second composite region 108 the layer surface of the third carrier layer 207 facing the second carrier layer 216 comprises no "coat". All the abovementioned polyethylene layers are made of LDPE 19N430 from Ineos Köln GmbH. The further fixing element 104, the anvil, comprises a recess 217 comprising a first recess region 211 and a second recess region 212. In the first recess region 211 the recess 217 has a first maximum depth 213 of 1.5 mm. In the second recess region 212 the recess 217 has a second maximum depth 214 of 1.25 mm. In this embodiment the depth of the recess 217 is in each case constant over the first recess region 211 and the second recess region 212. The first composite region 107 is located at least partially between the first recess region 211 and the first fixing surface 105. The second composite region 108 is located at least partially between the second recess region 212 and the first fixing surface 105. It is to be noted here that a thickened side of the longitudinal seam 111, in FIG. 2 the upper side of the planar composite 101, is not facing the further fixing surface 106 with the recess 217, but rather is facing the first fixing surface 105, which comprises no recess 217.

FIG. 3 shows a diagram of a cross-section of a further device 100 according to the invention. The device 100 is identical to the device 100 from FIG. 2, apart from the fact that in FIG. 3 the recess 217 is located in the first fixing surface 105. The further fixing surface 106 comprises no recess 217. Furthermore, in FIG. 3 the first fixing element 103 is an anvil and the further fixing element 104 is a sonotrode.

Figure 4:
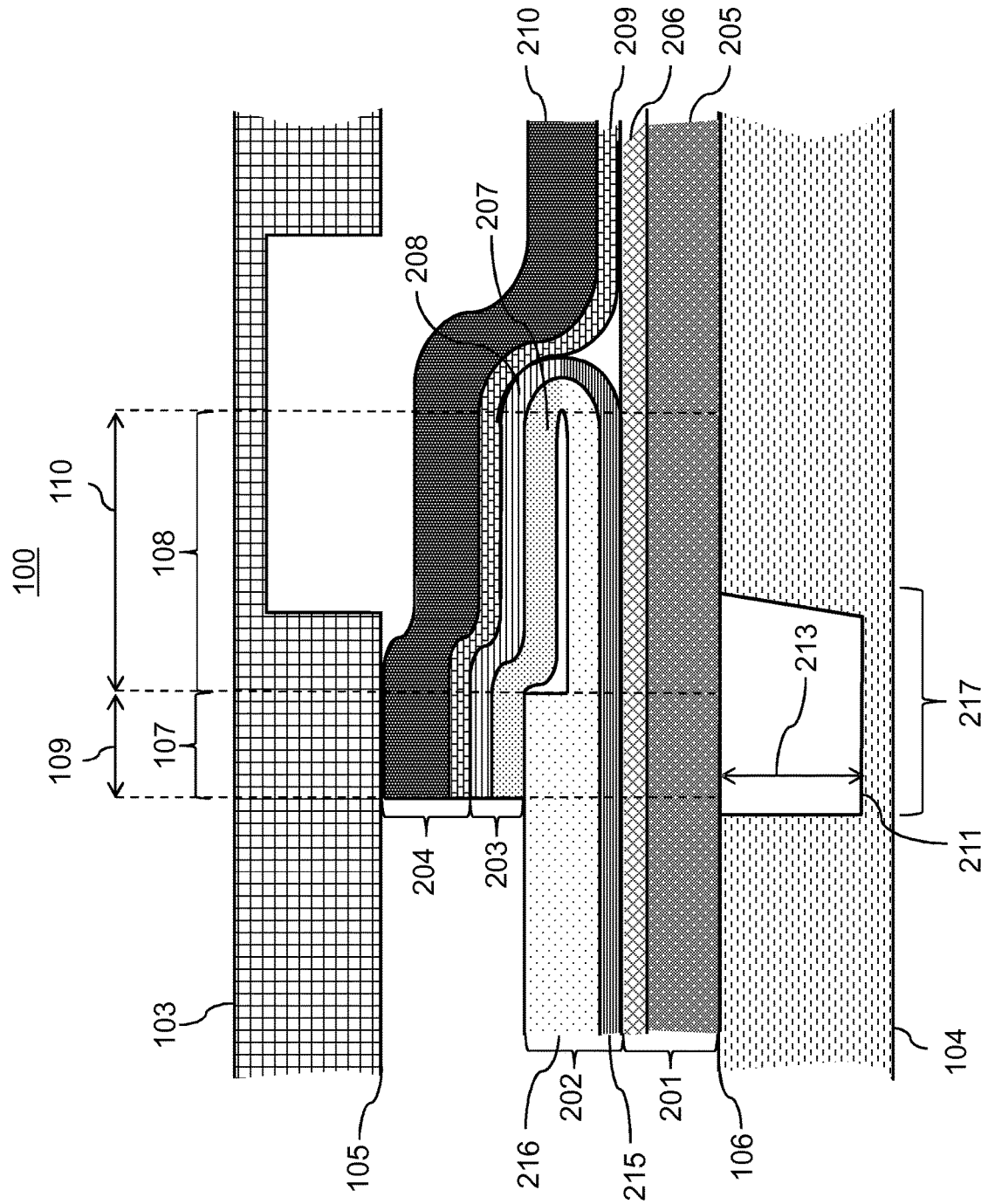
FIG. 4 a diagram of a cross-section of a further device according to the invention.

FIG. 4 shows a diagram of a cross-section of a further device 100 according to the invention. The device 100 is identical to the device 100 from FIG. 2, apart from the fact that in FIG. 4 the recess 217 in the further fixing surface 106 comprises the first recess region 211 but not the second recess region 212. Furthermore, the first fixing surface 105 in FIG. 4 comprises a recess which coincides in depth, width, length and lateral positioning with respect to the planar composite 101 with the second recess region 212 from FIG. 2.

FIG. 5 shows a diagram of a cross-section of a further device 100 according to the invention. FIG. 5 shows in cross-section a region of a planar composite 101 which is fixed between a first fixing surface 105 of a first fixing element 103, here a sonotrode made of a titanium alloy, and a further fixing surface 106 of a further fixing element 104, here an anvil. The folded planar composite 101 comprises a first composite region 107, a second composite region 108 and a third composite region 501, which in each case are included in a longitudinal seam 111 of a container precursor 102. The first composite region 107 has a first width 109 of 3 mm. The second composite region 108 has a second width 110 of 5 mm. The third composite region 501 has a third width 502 of 4 mm. The first composite region 107 comprises a first layer sequence comprising as layers overlapping one another in the direction from the further fixing surface 106 to the first fixing surface 105 a first composite layer 201, a second composite layer 202, a third composite layer 203 and a fourth composite layer 204. The first composite layer 201 comprises as the first composite layer sequence in the direction from the further fixing surface 106 to the first fixing surface 105 a first polyethylene layer (not shown), a first carrier layer 205, a second polyethylene layer (not shown), a first barrier layer 206 and a third polyethylene layer. The second composite layer 202 comprises as the second composite layer sequence in the direction from the further fixing surface 106 to the first fixing surface 105 a first polyethylene layer (not shown), a second barrier layer 215, a second polyethylene layer (not shown) and a second carrier layer 216. In the first composite region 107 and the third composite region 501 the second composite layer 202 further comprises a third polyethylene layer (not shown), which overlaps the second carrier layer 216 on one side facing away from the second barrier layer 215. The third composite layer 203 comprises as the third composite layer sequence in the direction from the further fixing surface 106 to the first fixing surface 105 a third carrier layer 207, a first polyethylene layer (not shown), a third barrier layer 208 and a second polyethylene layer (not shown). The fourth composite layer 204 comprises as the fourth composite layer sequence in the direction from the further fixing surface 106 to the first fixing surface 105 a first polyethylene layer (not shown), a fourth barrier layer 209, a second polyethylene layer (not shown), a fourth carrier layer 210 and a third polyethylene layer (not shown). In the first composite region 107 the second composite layer 202 and the third composite layer 203 are joined to one another by sealing of the third polyethylene layer of the second composite layer 204. Furthermore, the third composite layer 203 is joined to the fourth composite layer 204 by sealing of the second polyethylene layer of the third composite layer 203 and the first polyethylene layer of the fourth composite layer 204. In the first composite region the third carrier layer 207 is characterised by a layer thickness which is smaller by a factor of 0.2 than in each case the first carrier layer 205, the second carrier layer 216 and the fourth carrier layer 210. The second composite region 108 comprises a second layer sequence comprising as layers overlapping one another in the direction from the further fixing surface 106 to the first fixing surface 105 the first composite layer 201, the second composite layer 202, the third composite layer 203 and the fourth composite layer 204. In the second composite region 108 the third composite layer 203 is joined to the fourth composite layer 204 by sealing of the second polyethylene layer of the third composite layer 203 and the first polyethylene layer of the fourth composite layer 204. In the second composite region 108 in each case the first carrier layer 205 and the fourth carrier layer 210 are characterised by a layer thickness which is greater by a factor of 5 than in each case the second carrier layer 216 and the third carrier layer 207. The second composite layer 202 and the third composite layer 203 are not joined to one another in the second composite region 108 but are partially in contact with one another. The third composite region 501 comprises a third layer sequence comprising as layers overlapping one another in the direction from the further fixing surface 106 to the first fixing surface 105 the first composite layer 201, the second composite layer 202 and the fourth composite layer 204. In the third composite region 501 the second composite layer 202 is joined to the fourth composite layer 204 by sealing of the third polyethylene layer of the second composite layer 202 and the first polyethylene layer of the fourth composite layer 204. The third composite region 501 is adjacent to the first composite region 107. The first composite layer 201 passes into the second composite layer 202 at the fold point shown in FIG. 5. In the first composite region 107, the second composite region 108 and the third composite region 501 the four composite layers 201, 202, 203 and 204, however, do not pass into one another in such a way but as described above form a layer sequence for each composite region 107, 108. In the first composite region 107 the third carrier layer 207 is skived, but not the second carrier layer 216. In the second composite region 108 the second carrier layer 216 and the third carrier layer 207 are skived. All the barrier layers 206, 215, 208, 209 occurring in FIG. 5 are made of aluminium EN A W 8079 from Hydro Aluminium Deutschland GmbH. These layers 206, 215, 208, 209 in each case have a layer thickness of 6 μm and are constructed in one piece with one another. These barrier layers 206, 215, 208, 209 belong to the planar composite 101 and in each case pass into one another at folds. For the second barrier layer 215 and the third barrier layer 208 this is shown with the fold in FIG. 5. Similarly, all the carrier layers 205, 216, 207, 210 occurring in FIG. 5 are constructed in one piece with one another. These carrier layers 205, 216, 207, 210 belong to the planar composite 101 and in each case pass into one another at folds. For the second carrier layer 216 and the third carrier layer 207 this is shown with the fold in FIG. 5. Further folds of the planar composite 101 are not shown in FIG. 5. For production of the container precursor 102, a carrier material (Stora Enso Natura T Duplex Doppelstrich from Stora Enso Oyj A G, Scott bond value of 200 J/m², residual moisture content 7.5%) with in each case a "coat" on both carrier sides was used. Both layer surfaces of each carrier layer 205, 216, 207, 210 in FIG. 5 accordingly in principle comprise a "coat". However, skived layer surfaces comprise no "coat". The layer surface of the second carrier layer 216 facing the third carrier layer 207 thus comprises no "coat" in the second composite region 108. In the first composite region 107 the layer surface of the second carrier layer 216 facing the third carrier layer 207 comprises a "coat". In the first composite region 107 as in the second composite region 108 the layer surface of the third carrier layer 207 facing the second carrier layer 216 comprises no "coat". All the abovementioned polyethylene layers are made of LDPE 19N430 from Ineos Köln GmbH. The further fixing element 104, the anvil, comprises a recess 217 comprising a first recess region 211, a second recess region 212 and a third recess region 503. The third recess region 503 is adjacent to the first recess region 211. In the first recess region 211 the recess 217 has a first maximum depth 213 of 1.5 mm. In the second recess region 212 the recess 217 has a second maximum depth 214 of 1.25 mm. In the third recess region 503 the recess 217 has a third maximum depth 504 of 1.4 mm. In this embodiment the depth of the recess 217 is in each case constant over the first recess region 211, the second recess region 212 and the third recess region 503. The first composite region 107 is located at least partially between the first recess region 211 and the first fixing surface 105. The second composite region 108 is located at least partially between the second recess region 212 and the first fixing surface 105. The third composite region 501 is located at least partially between the third recess region 503 and the first fixing surface 105. It is to be noted here that a thickened side of the longitudinal seam 111, in FIG. 5 the upper side of the planar composite 101, is not facing the further fixing surface 106 with the recess 217, but rather is facing the first fixing surface 105, which comprises no recess 217.

Figure 6:
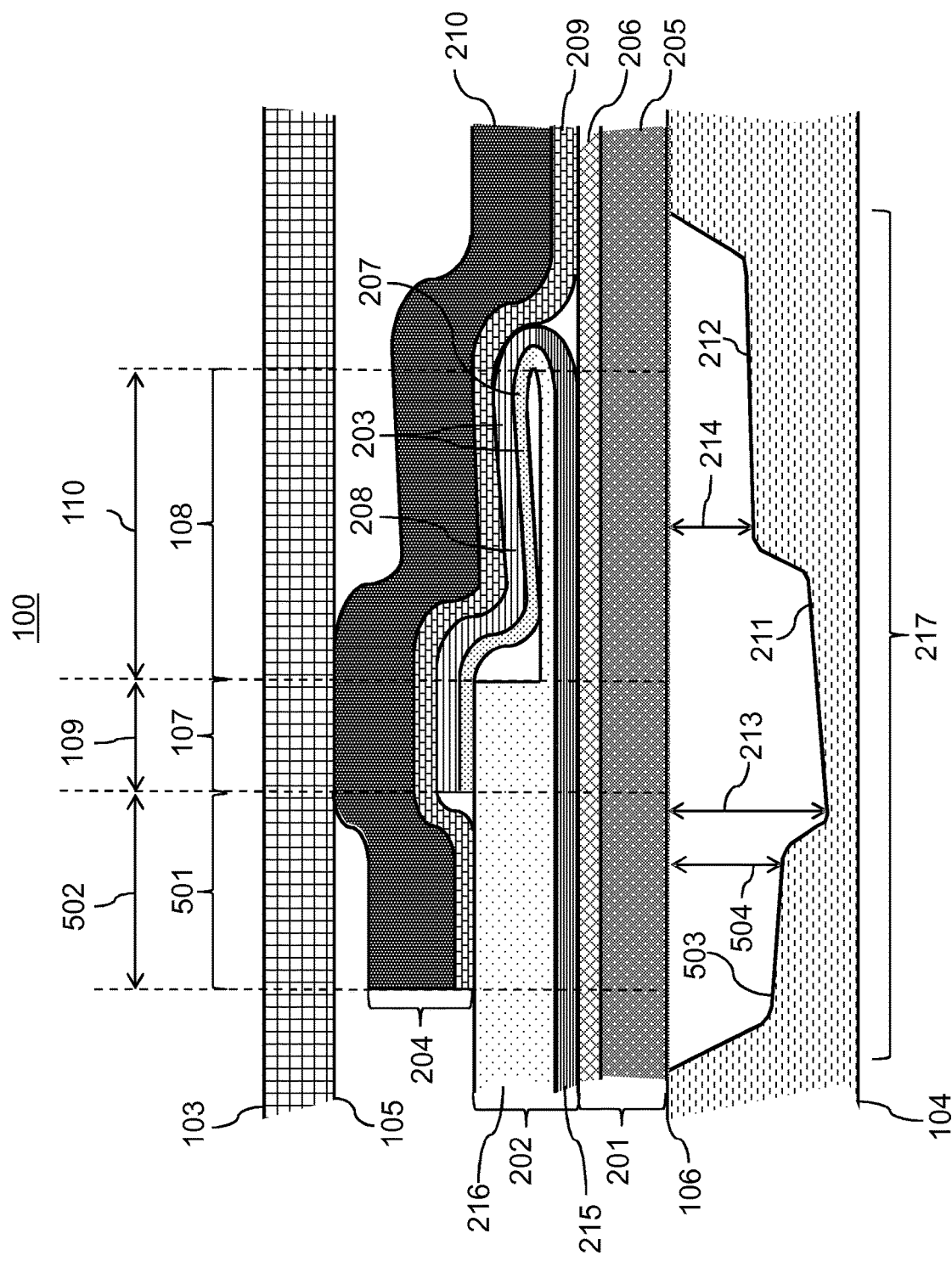
FIG. 6 a diagram of a cross-section of a further device according to the invention.

FIG. 6 shows a diagram of a cross-section of a further device 100 according to the invention. The device 100 is identical to the device 100 from FIG. 5, apart from the fact that the depth of the recess 217 in and over the three recess regions 211, 212, 503 varies continuously and without jumps. Furthermore, the depth of the recess 217 is not constant within each one of the three recess regions 211, 212, 503.

Figure 7:
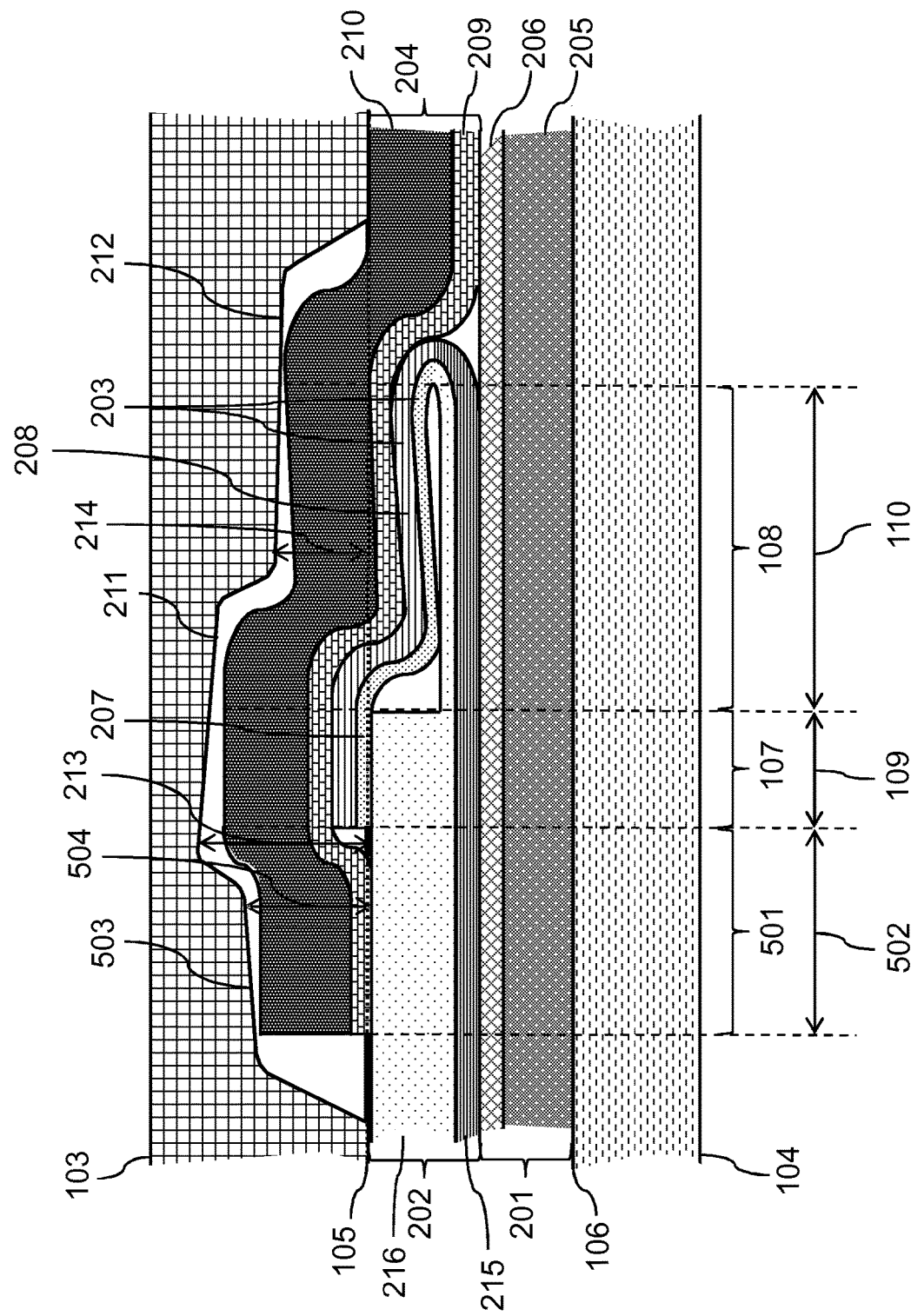
FIG. 7 a diagram of a cross-section of a further device according to the invention.

FIG. 7 shows a diagram of a cross-section of a further device 100 according to the invention. The device 100 is identical to the device 100 from FIG. 5, apart from the fact that in FIG. 7 the recess 217 is located in the first fixing surface 105. The further fixing surface 106 comprises no recess 217. Furthermore, in FIG. 7 the first fixing element 103 is an anvil and the further fixing element 104 is a sonotrode made of a titanium alloy.

Figure 8:
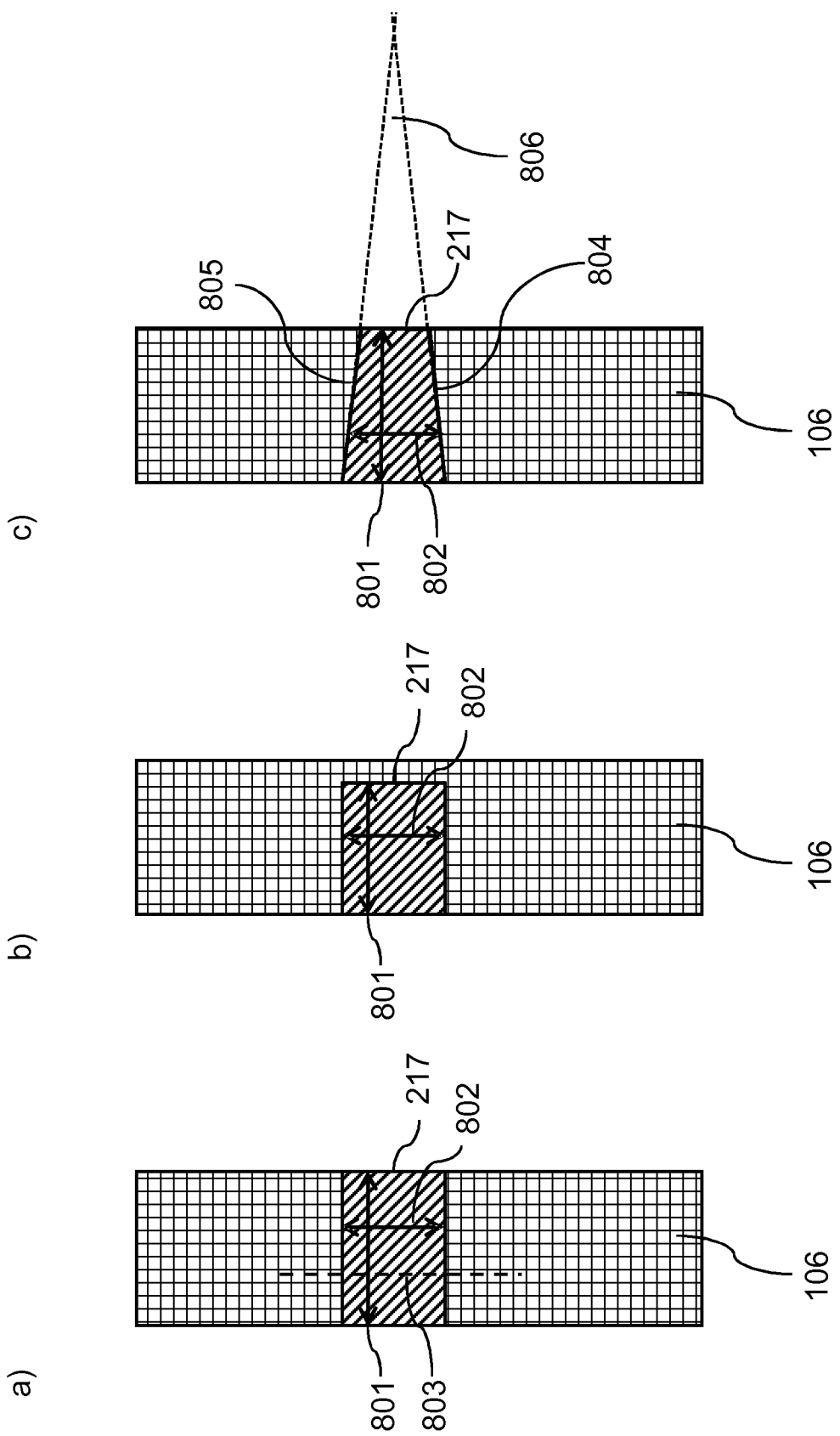
FIG. 8a) a diagram of a plan view of a further fixing surface according to the invention.
FIG. 8b) a diagram of a plan view of a further fixing surface according to the invention.
FIG. 8c) a diagram of a plan view of a further fixing surface according to the invention.

FIG. 8a) shows a diagram of a plan view of a further fixing surface 106 according to the invention of a further fixing element 104. The further fixing surface 106 is a rectangular flat side surface of a parallelepipedal further fixing element 104. The further fixing surface 106 comprises a recess 217, which extends from one edge of the further fixing element 104 to an opposite edge. The recess 217 has a length 801 in the direction of a periphery of the further fixing element 104. The length 801 is 30% of the periphery. Furthermore, the recess 217 has a width 802. A depth of the recess 217 is a universally constant function of a position on an imaginary straight line 803 which runs in the direction of the width 802 of the recess 217.

FIG. 8b) shows a diagram of a plan view of a further fixing surface 106 according to the invention of a further fixing element 104. The further fixing surface 106 is a rectangular flat side surface of a parallelepipedal further fixing element 104. The further fixing surface 106 comprises a recess 217, which does not extend from one edge of the further fixing element 104 to an opposite edge. The recess 217 has a length 801 in the direction of a periphery of the further fixing element 104. The length 801 is 20% of the periphery. Furthermore, the recess 217 has a width 802.

FIG. 8c) shows a diagram of a plan view of a further fixing surface 106 according to the invention of a further fixing element 104. The further fixing surface 106 is a rectangular flat side surface of a parallelepipedal further fixing element 104. The further fixing surface 106 comprises a recess 217, which extends from one edge of the further fixing element 104 to an opposite edge. The recess 217 has a length 801 in the direction of a periphery of the further fixing element 104. The length 801 is 30% of the periphery. Furthermore, the recess 217 has a width 802 which becomes smaller along the periphery. The recess 217 further is demarcated on sides of the recess 217 opposite one another by a first edge 804 and a further edge 805. The first edge 804 comprises a straight first edge section 804 and the further edge 805 comprises a straight further edge section 805. The straight first edge section 804 and the straight further edge section 805 enclose an angle 806 of 20°.

Figure 9:
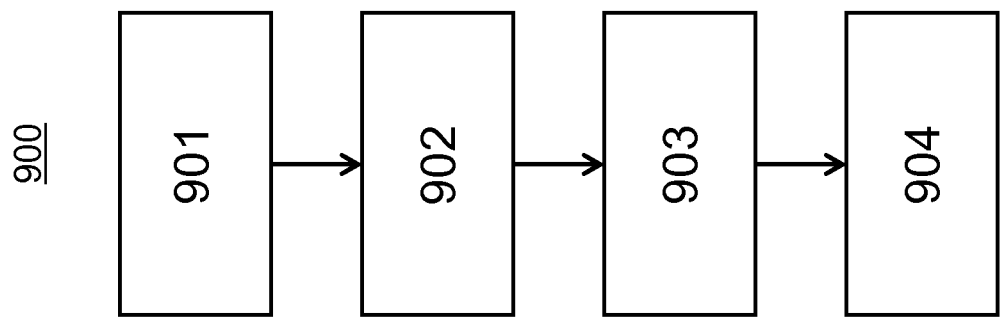
FIG. 9 a flow diagram of a method according to the invention.

FIG. 9 shows a flow diagram of a method 900 according to the invention. The closed container 1200 in FIG. 12 can be produced by the method 900. The method 900 comprises a method step a) 901: providing a folded planar composite 101 according to FIG. 10. In a method step b) 902 a first fixing element 103 comprising a first fixing surface 105 and a further fixing element 104 comprising a further fixing surface 106 are provided. The first fixing element 103 is a sonotrode made of a titanium alloy. The further fixing element 104 is an anvil for the sonotrode. The further fixing surface 106 here comprises a recess 217 comprising a first recess region 211, a second recess region 212 and a third recess region 503. The recess 217 has in the first recess region 211 a first maximum depth 213, in the second recess region 212 a second maximum depth 214 and in the third recess region 503 a third maximum depth 504. The first maximum depth 213 is greater than the second maximum depth 214. The third maximum depth 504 is greater than the second maximum depth 214 and less than the first maximum depth 213. In a method step c) 903 the fourth composite layer 204 of the planar composite 101 and the first fixing surface 105, as well as the first composite layer 201 and the further fixing surface 106, as well as the first composite layer 201 and the second composite layer 202 are in each case brought into contact with one another by pressing the planar composite 101 between the first fixing surface 105 and the further fixing surface 106. The first composite region 107 here is located at least partially between the first recess region 211 and the first fixing surface 105, and the second composite region 108 is located at least partially between the second recess region 212 and the first fixing surface 105, and the third composite region 501 is located at least partially between the third recess region 503 and the first fixing surface 105. The arrangement of the planar composite 101 and the two fixing elements 103, 104 during the bringing into contact of method step c) 903 corresponds to the arrangement of the device 100 in FIG. 6. The result of this is that during pressing on all three composite regions 107, 108, 501 as far as possible the same pressure is exerted. In a method step d) 904 the first composite layer 201 is joined to the second composite layer 202. For this an ultrasonic vibration is transferred from the sonotrode to the planar composite 101. The ultrasonic vibration is excited at 30 kHz and an amplitude of 10 μm for 200 ms. By this means the third polyethylene layer of the first composite layer 201, i.e. the polyethylene layer which overlaps the first barrier layer 206 on one side facing away from the first carrier layer 205, is heated to a temperature above its melting temperature. The joining is accordingly a sealing with this polyethylene layer. By this sealing the head region 112 of the container precursor 102 is closed and a closed container 1200 is thus obtained.

Figure 10:
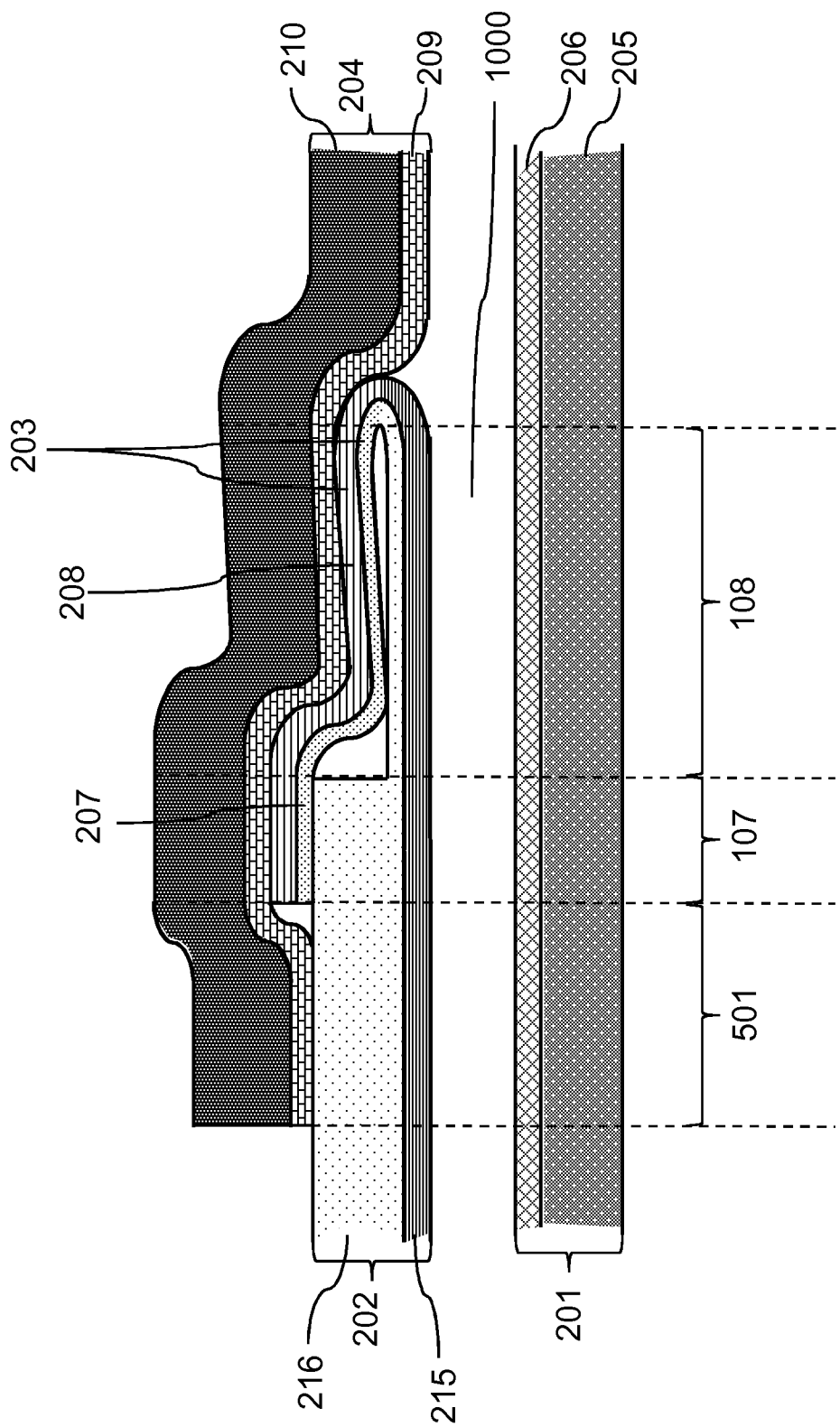
FIG. 10 a diagram of a cross-section of a planar composite provided for a method according to the invention.

FIG. 10 shows a diagram of a cross-section of a folded planar composite 101 provided for the method 900 according to the invention from FIG. 9. The folded planar composite 101 is folded and sealed such that it forms a container precursor 102 according to FIG. 1a) having a longitudinal seam 111. The container precursor 102 here is open in its head region 112. The folded planar composite 101 comprises a first composite layer 201, a second composite layer 202, a third composite layer 203, a fourth composite layer 204 and a first composite region 107, a second composite region 108 and a third composite region 501. The first composite region 107 has a first width 109 of 3 mm. The second composite region 108 has a second width 110 of 5 mm. The third composite region 501 has a third width 502 of 4 mm. Between the first composite layer 201 and the second composite 202 is located an intermediate region 1000. As a result of this the container precursor 102, as mentioned above, is open in its head region 112. A person viewing FIG. 10 accordingly is looking into the opened container precursor 102 when looking at the intermediate region 1000. The structure of the four composite layers 201, 202, 203, 204 corresponds to the structure of the composite layers 201, 202, 203, 204 of the same name in FIG. 6. The first composite region 107 comprises a first layer sequence comprising as layers overlapping one another in the direction from the intermediate region 1000 through the first layer sequence the second composite layer 202, the third composite layer 203 and the fourth composite layer 204. In the first composite region 107 the second composite layer 202 is joined to the third composite layer 203 and the third composite layer 203 is joined to the fourth composite layer 204. In the first composite region 107 the third carrier layer 207 is characterised by a smaller layer thickness than in each case the first carrier layer 205, the second carrier layer 216 and the fourth carrier layer 210. The second composite region 108 comprises a second layer sequence comprising as layers overlapping one another in the direction from the intermediate region 1000 through the second layer sequence the second composite layer 202, the third composite layer 203 and the fourth composite layer 204. In the second composite region 108 the third composite layer 203 is joined to the fourth composite layer 204, but the second composite layer 202 is not joined to the third composite layer 203. In the second composite region 108 in each case the first carrier layer 205 and the fourth carrier layer 210 are characterised by a greater layer thickness than in each case the second carrier layer 216 and the third carrier layer 207. The third composite region 501 is adjacent to the first composite region 107. The third composite region 501 comprises a third layer sequence comprising as layers overlapping one another in the direction from the intermediate region 1000 through the third layer sequence the second composite layer 202 and the fourth composite layer 204. In the third composite region 501 the third composite layer 203 is joined to the fourth composite layer 204. In the third composite region 501 the first carrier layer 205, the second carrier layer 216 and the fourth carrier layer 210 are characterised by a layer thickness of equal size.

Figure 11:
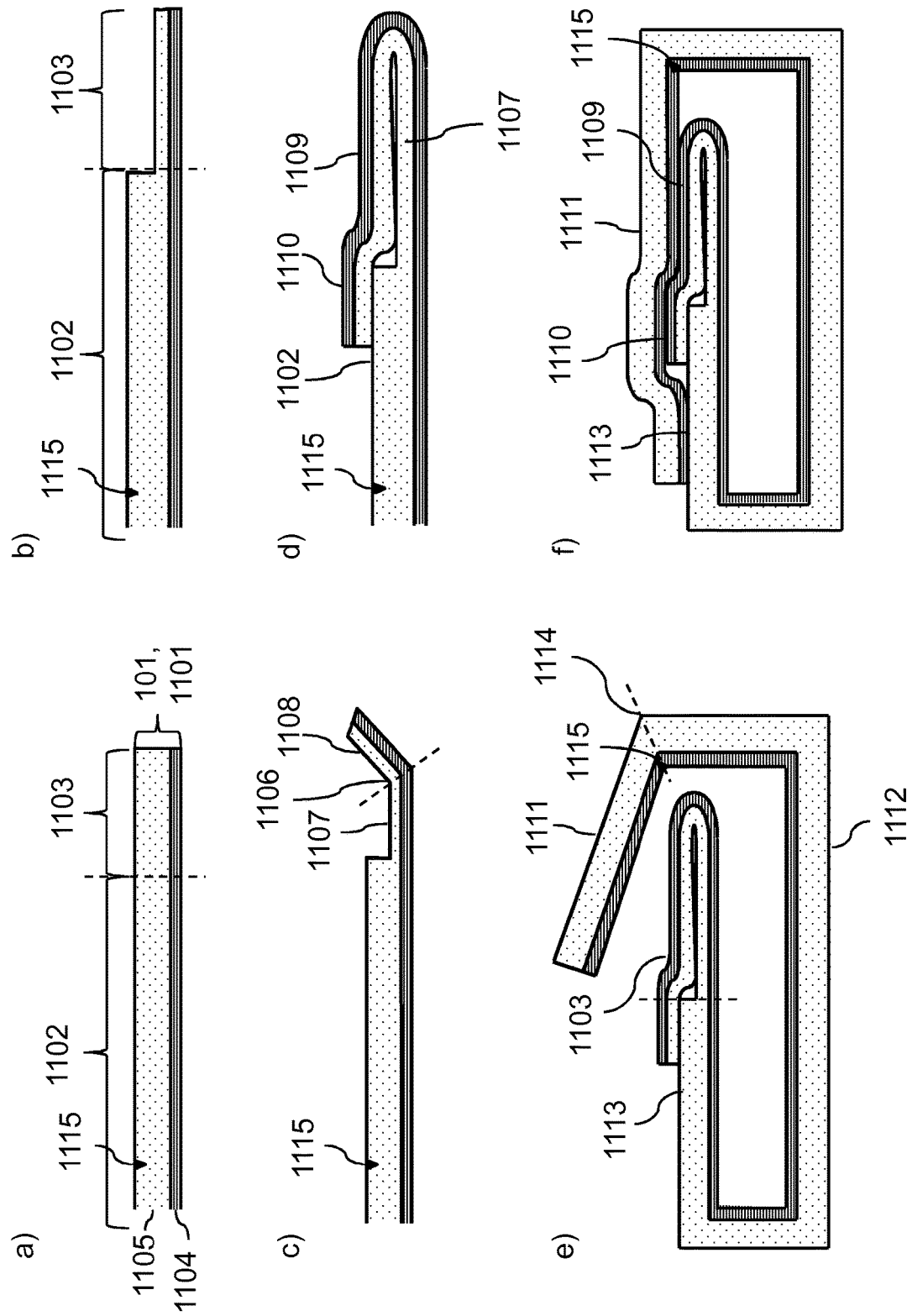
FIG. 11a) illustration of method step i) of a method according to the invention.
FIG. 11b) illustration of method step ii) of a method according to the invention.
FIG. 11c) illustration of method step iii) of a method according to the invention.
FIG. 11d) illustration of method step iv) of a method according to the invention.
FIG. 11e) illustration of method step v) of a method according to the invention.
FIG. 11f) illustration of method step vi) of a method according to the invention.

FIG. 11a) shows a diagram of a method step i) of a method 900 according to the invention. In method step i) a planar composite 101 is provided. The planar composite 101 comprises a layer sequence 1101. The layer sequence 1101 comprises as layers overlapping one another a composite carrier layer 1105 and a composite barrier layer 1104. The composite barrier layer 1104 is an aluminium layer (aluminium EN A W 8079 from Hydro Aluminium Deutschland GmbH). The composite carrier layer 1105 is a cardboard layer (Stora Enso Natura T Duplex Doppelstrich from Stora Enso Oyj A G, Scott bond value of 200 J/m2, residual moisture content 7.5%). Between the composite carrier layer 1105 and the composite barrier layer 1104 is located a polyethylene layer (not shown, LDPE 19N430 from Ineos Köln GmbH). The planar composite can be divided into an edge region 1103 and an inside region 1102. The edge region 1103 is adjacent to the inside region 1102 at the broken line in FIG. 11a). In the inside region 1102 the planar composite 101 comprises a score 1115. Providing of the planar composite 101 in method step a) 901 of a method 900 according to the invention is realised by method steps i) to vi) illustrated in FIGS. 11a) to f).

FIG. 11b) shows a diagram of a method step ii) of a method 900 according to the invention. The method 900 is the same method 900 as in FIG. 11a). Method step ii) comprises reducing a layer thickness of the composite carrier layer 1105 in the edge region 1103. The reducing is carried out here as skiving of the composite carrier layer 1105 with a rotating cup blade. This is carried out with a skiving tool model VN 50 from Fortuna Spezialmaschinen GmbH, Weil der Stadt, Germany. The layer thickness of the composite carrier layer 1105 is thereby reduced by 25% of the original layer thickness.

FIG. 11c) shows a diagram of a method step iii) of a method 900 according to the invention. The method 900 is the same method 900 as in FIG. 11a). In method step iii) a fold 1106 is produced in the edge region 1103 and a first edge fold region 1107 and a further edge fold region 1108 are thus obtained. The first edge fold region 1107 and the further edge fold region 1108 are adjacent to one another along the fold 1106.

FIG. 11d) shows a diagram of a method step iv) of a method 900 according to the invention. The method 900 is the same method 900 as in FIG. 11a). Method step iv) comprises bringing into contact the first edge fold region 1107 with a first part 1109 of the further edge fold region 1108, and joining of a further part 1110 of the further edge fold region 1108 to the inside region 1102.

FIG. 11e) shows a diagram of a method step v) of a method 900 according to the invention. The method 900 is the same method 900 as in FIG. 11a). Method step v) comprises producing a further fold 1114 along the score 1115 in the inside region 1102 to obtain a first composite fold region 1111 and a further composite fold region 1112. The further composite fold region 1112 here comprises a part 1113 of the inside region 1102.

FIG. 11f) shows a diagram of a method step vi) of a method 900 according to the invention. The method 900 is the same method 900 as in FIG. 11a). Method step vi) comprises joining the first composite fold region 1111 to the first part 1109 of the further edge fold region 1108 and the further part 1110 of the further edge fold region 1108 and the part 1113 of the inside region 1102. The joining is thereby effected as a sealing. The sealing is carried out as bringing into contact, heating to a sealing temperature and pressing. The heating is carried out here by blowing on hot air. A container precursor 102 is thus produced in method steps i) to vi) of the method 900 by folding the planar composite 101 and producing a longitudinal seam 111.

Figure 12:
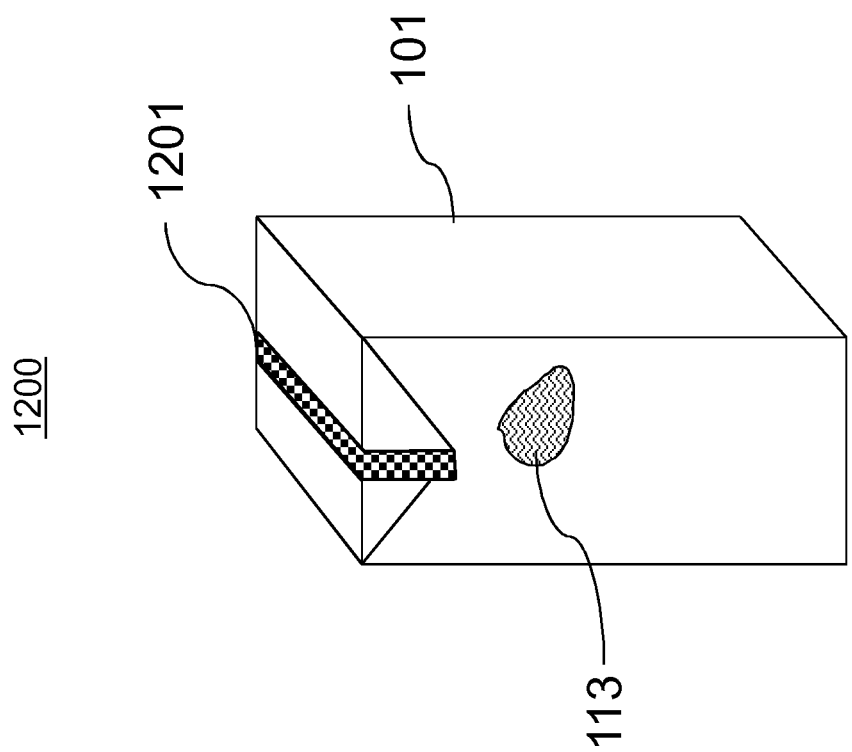
FIG. 12 diagram of a closed container according to the invention.

FIG. 12 shows a diagram of a closed container 1200 according to the invention. The closed container 1200 is obtainable by the method 900 in FIG. 9. The closed container 1200 is made of a folded planar composite 101 constructed in one piece. The closed container 1200 surrounds an interior 113 which contains a foodstuff. The container 1200 has been closed in its head region 112 by the method 900 in FIG. 9. This closing was effected by ultrasonic sealing and therefore production of a head seam 1201.

Figure 13:
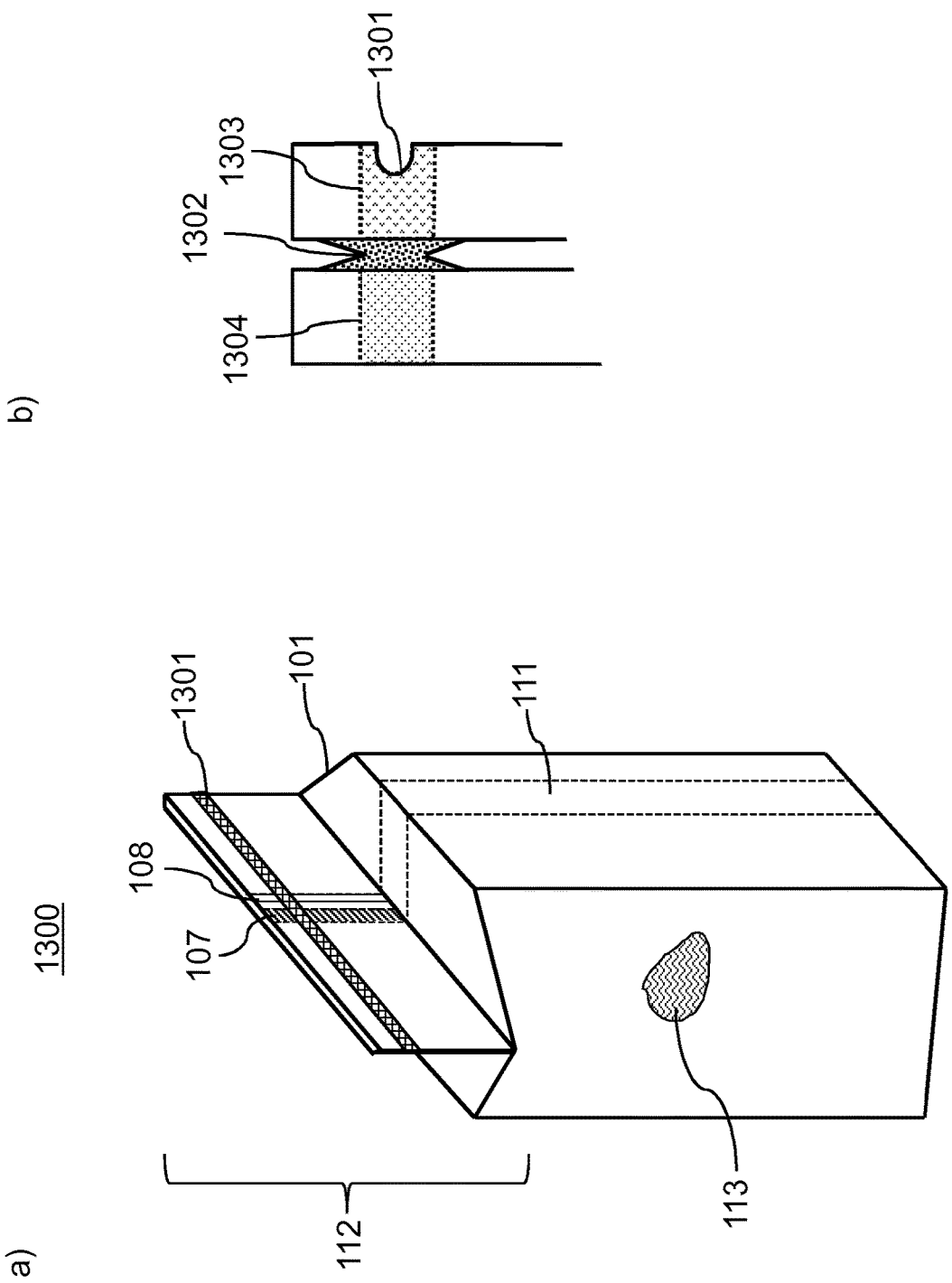
FIG. 13a) a diagram of a further closed container according to the invention.
FIG. 13b) a diagram of a cross-section through the seam and the depression of the closed container in FIG. 13a)

FIG. 13a) shows a diagram of a further closed container 1300 according to the invention. This is made of a folded planar composite 101. Furthermore, the container 1300 surrounds an interior 113 which contains a foodstuff. In a head region 112, also called gable region, closed via a seam 1302 the container 1300 comprises a first composite region 107 and a second composite region 108. The first composite region 107 has a first width 109 of 2 mm. The second composite region 108 has a second width 110 of 4 mm. The first composite region 107 and the second composite region 108 are included in a longitudinal seam 111 of the container 1300. The longitudinal seam 111 extends over an entire length of the container 1300. Along the longitudinal seam 111 opposite ends of the folded planar composite 101 are joined to one another in order thus to form the container 1300. A depression 1301 in the planar composite 101, more precisely in a first seam region 1301 of the planar composite 101, runs along the seam 1302 (shown in FIG. 13b)). The seam 1302 and the depression 1301 cross the longitudinal seam 111. The depression 1301 has a width of 3 mm. The folded planar composite 101 surrounds the interior 113 on all sides, the planar composite 101 being constructed in one piece.

FIG. 13b) shows a diagram of a cross-section through the seam 1302 and the depression 1301 of the closed container 1300 in FIG. 13a). The depression 1301 has a depth of 0.5 mm. A first seam region 1303 and a further seam region 1304 are joined to one another along the seam 1302. The first seam region 1303 has the depression 1301 along the seam 1302.

Figure 14:
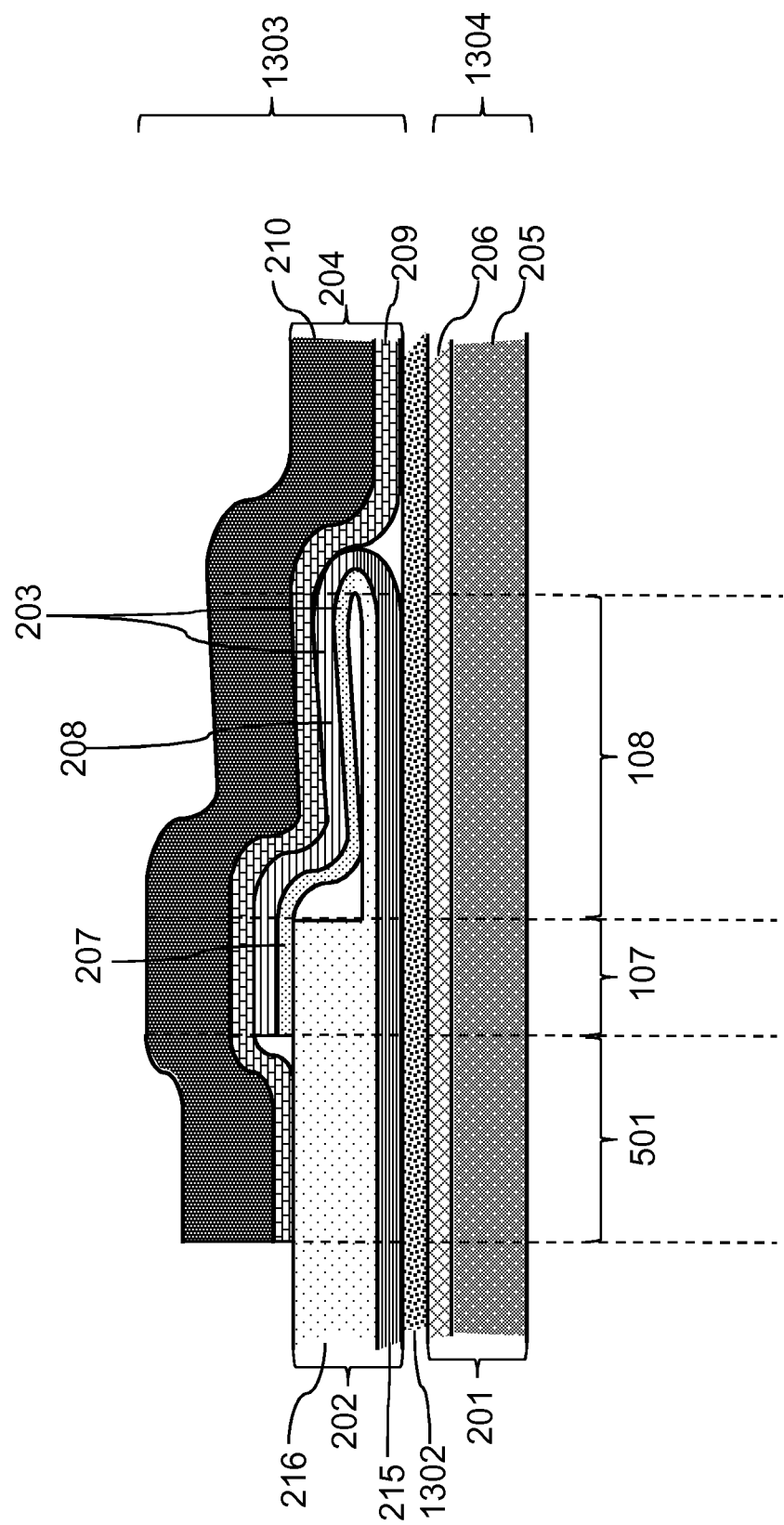
FIG. 14 a diagram of a longitudinal section through the seam and the depression of the closed container in FIG. 13a)

FIG. 14 shows a diagram of a longitudinal section through the seam 1302 and the depression 1301 of the closed container 1300 in FIG. 13a). The further seam region 1304 comprises a first composite layer 201. The first seam region 1303 comprises a second composite layer 202, a third composite layer 203, a fourth composite layer 204 and a first composite region 107, a second composite region 108 and a third composite region 501. Between the first composite layer 201 and the second composite layer 202 is located the seam 1302, which is made of sealed polyethylene (LDPE 19N430 from Ineos Köln GmbH). The first composite region 107 has a first width 109 of 3 mm. The second composite region 108 has a second width 110 of 5 mm. The third composite region 501 has a third width 502 of 4 mm. The structure of the four composite layers 201, 202, 203, 204 corresponds to the structure of the composite layers 201, 202, 203, 204 of the same name in FIG. 6. The first composite region 107 comprises a first layer sequence comprising as layers overlapping one another in the direction from the seam 1302 through the first layer sequence the second composite layer 202, the third composite layer 203 and the fourth composite layer 204. In the first composite region 107 the second composite layer 202 is joined to the third composite layer 203 and the third composite layer 203 is joined to the fourth composite layer 204. With respect to the first composite region 107 the third carrier layer 207 is characterised by a smaller layer thickness than in each case the first carrier layer 205, the second carrier layer 216 and the fourth carrier layer 210. The second composite region 108 comprises a second layer sequence comprising as layers overlapping one another in the direction from the seam 1302 through the second layer sequence the second composite layer 202, the third composite layer 203 and the fourth composite layer 204. In the second composite region 108 the third composite layer 203 is joined to the fourth composite layer 204, but the second composite layer 202 is not joined to the third composite layer 203. With respect to the second composite region 108 in each case the first carrier layer 205 and the fourth carrier layer 210 are characterised by a greater layer thickness than in each case the second carrier layer 216 and the third carrier layer 207. The third composite region 501 is adjacent to the first composite region 107. The third composite region 501 comprises a third layer sequence comprising as layers overlapping one another in the direction from the seam 1302 through the third layer sequence the second composite layer 202 and the fourth composite layer 204. In the third composite region 501 the third composite layer 203 is joined to the fourth composite layer 204. With respect to the third composite region 501 the first carrier layer 205, the second carrier layer 216 and the fourth carrier layer 210 are characterised by a layer thickness of equal size.

FIG. 15 shows a diagram of a cross-section of an arrangement 1500, which is not according to the invention, for sealing a head region of a container precursor. The arrangement 1500 is the arrangement 1500 according to Comparative Example 1. The sealing of the head region is effected here by blowing on hot air 1501. The blowing on is indicated by the arrows in FIG. 15.

FIG. 16 shows a diagram of a cross-section of a further arrangement 1600, which is not according to the invention, for sealing a head region of a container precursor. The arrangement 1600 is the arrangement 1600 according to Comparative Example 2. The sealing of the head region is effected here by ultrasound, which is transferred to the laminate by means of a sonotrode (further fixing element 104). The contact surfaces, the first fixing surface 105 and the further fixing surface 106, of the anvil 103 and the sonotrode 104, are flat in construction.

FIG. 17 shows a diagram of a cross-section of an arrangement 1700 according to the invention for sealing a head region of a container precursor. The arrangement 1700 is the arrangement 1700 according to Example 1. The sealing of the head region is effected here by ultrasound, which is transferred to the laminate by means of a sonotrode (further fixing element 104). The contact surface of the anvil (first fixing element 103), that is to say the first fixing surface 105, comprises a recess 217 for accommodating the thickening of the longitudinal seam.

FIG. 18 shows a diagram of a cross-section of a further arrangement 1800 according to the invention for sealing a head region of a container precursor. The arrangement 1800 is the arrangement 1800 according to Example 2. The sealing of the head region is effected here by ultrasound, which is transferred to the laminate by means of a sonotrode (further fixing element 104). The contact surface of the anvil (first fixing element 103), that is to say the first fixing surface 105, comprises a recess 217 for accommodating the thickening of the longitudinal seam. In contrast to Example 1 the skived third composite layer 203 is laid completely on the skived region of the second composite layer 202.

FIG. 19 shows a diagram of a cross-section of a further arrangement 1900 according to the invention for sealing a head region of a container precursor. The arrangement 1900 is the arrangement 1900 according to Example 3. In contrast to FIG. 3 the first fixing element 103 (anvil) here comprises a recess having a constant depth over the entire recess.

LIST OF REFERENCE SYMBOLS

100 Device according to the invention
101 Planar composite
102 Container precursor
103 First fixing element
104 Further fixing element
105 First fixing surface
106 Further fixing surface
107 First composite region
108 Second composite region
109 First width
110 Second width
111 Longitudinal seam
112 Head region
113 Interior
201 First composite layer
202 Second composite layer
203 Third composite layer
204 Fourth composite layer
205 First carrier layer
206 First barrier layer
207 Third carrier layer
208 Third barrier layer
209 Fourth barrier layer
210 Fourth carrier layer
211 First recess region
212 Second recess region
213 First maximum depth
214 Second maximum depth
215 Second barrier layer
216 Second carrier layer
217 Recess
501 Third composite region
502 Third width
503 Third recess region
504 Third maximum depth
801 Length
802 Width
803 Straight line
804 First edge/straight first edge section
805 Further edge/straight further edge section
806 Angle
900 Method according to the invention
901 Method step a)
902 Method step b)
903 Method step c)
904 Method step d)
1000 Intermediate region
1101 Layer sequence
1102 Inside region
1103 Edge region
1104 Composite barrier layer
1105 Composite carrier layer
1106 Fold
1107 First edge fold region
1108 Further edge fold region
1109 First part of the further edge fold region
1110 Further part of the further edge fold region
1111 First composite fold region
1112 Further composite fold region
1113 Part of the interior
1114 Further fold
1115 Score
1200 Closed container according to the invention
1201 Head seam
1300 Closed container according to the invention
1301 Depression
1302 Seam
1303 First seam region
1304 Further seam region
1500 Arrangement for sealing the head region according to Comparative Example 1
1501 Hot air
1600 Arrangement for sealing the head region according to Comparative Example 2
1700 Arrangement for sealing the head region according to Example 1
1800 Arrangement for sealing the head region according to Example 2
1900 Arrangement for sealing the head region according to Example 3

SEQUENCE LISTING

Not Applicable

The invention claimed is:

1. A system comprising:
(i) a container precursor including a folded planar composite;

(iii) a first fixing element; and
(iii) a further fixing element;
wherein the first fixing element and the further fixing element cooperate to close at least a portion of the container precursor in use of the system;
wherein the first fixing element comprises a first fixing surface and the further fixing element comprises a further fixing surface;
wherein the folded planar composite is at least partially fixed between the first fixing surface and the further fixing surface;
wherein the folded planar composite comprises a first composite region;
wherein the first composite region comprises a first layer sequence comprising as layers overlapping one another in a direction from the further fixing surface to the first fixing surface a first composite layer, a second composite layer, a third composite layer and a fourth composite layer;
wherein in the first composite region, the second composite layer is joined to the third composite layer and the third composite layer is joined to the fourth composite layer;
wherein the first composite layer comprises a first carrier layer;
wherein the second composite layer comprises a second carrier layer;
wherein the third composite layer comprises a third carrier layer;
wherein the fourth composite layer comprises a fourth carrier layer;
wherein in the first composite region, the second carrier layer has not been skived;
wherein in the first composite region, the third carrier layer is characterized by a smaller layer thickness than one selected from a group consisting of the first carrier layer, the second carrier layer and the fourth carrier layer or than each layer of a combination of at least two of these;
wherein the first fixing surface or the further fixing surface or both comprises a recess comprising a first recess region;
wherein the recess has a first maximum depth in the first recess region;
wherein the first composite region is located at least partially between the first recess region and the first fixing surface or the further fixing surface.

2. The system according to claim 1, wherein the folded planar composite further comprises a second composite region;
wherein the second composite region comprises a second layer sequence comprising as layers overlapping one another in the direction from the further fixing surface to the first fixing surface the first composite layer, the second composite layer, the third composite layer and the fourth composite layer;
wherein in the second composite region, the third composite layer is joined to the fourth composite layer;
wherein in the second composite region, the first carrier layer or the fourth carrier layer or each of both of these layers is characterized by a greater layer thickness than the second carrier layer or the third carrier layer or than each of both of these layers;
wherein the recess further comprises a second recess region;
wherein the recess has a second maximum depth in the second recess region;
wherein the first maximum depth is greater than the second maximum depth;
wherein the second composite region is located at least partially between the second recess region and the first fixing surface or the further fixing surface.

3. The system according to claim 1, wherein the further fixing surface comprises the recess.

4. The system according to claim 1, wherein the first composite layer comprises as the first composite layer sequence in the direction from the further fixing surface to the first fixing surface the first carrier layer and a first barrier layer;
wherein the second composite layer comprises as the second composite layer sequence in the direction from the further fixing surface to the first fixing surface a second barrier layer and the second carrier layer;
wherein the third composite layer comprises as the third composite layer sequence in the direction from the further fixing surface to the first fixing surface the third carrier layer and a third barrier layer;
wherein the fourth composite layer comprises as the fourth composite layer sequence in the direction from the further fixing surface to the first fixing surface a fourth barrier layer and the fourth carrier layer.

5. The system according to claim 2, wherein the first maximum depth is 1.1 to 5 times the size of the second maximum depth.

6. The system according to claim 1, wherein the first composite region is characterized by a first width; wherein the first width is in a range of from 1 to 6 mm; wherein the recess has a length perpendicular to the first width; wherein the first recess region is wider than the first width over at least 50% of the length.

7. The system according to claim 2, wherein the second composite region is characterized by a second width; wherein the second width is in a range of from 1 to 10 mm; wherein the recess has a length perpendicular to the second width; wherein the second recess region is wider than the second width over at least 50% of the length.

8. The system according to claim 1, wherein the recess has a length in the direction of a periphery of the fixing element comprising the recess; wherein a width of the recess becomes smaller along the periphery.

9. The system according to claim 1, wherein the first fixing element or the further fixing element or both is a sonotrode.

10. The system according to claim 9, wherein the sonotrode comprises one selected from a group consisting of an alloy comprising to the extent of at least 90 wt. % titanium or aluminum or both, based on the weight of the alloy; a steel; and a piezoceramic or a combination of at least two of these.

11. The system according to claim 1, wherein a depth of the recess is a universally constant function from a position on a straight line which runs in the direction of a width of the recess.

12. The system according to claim 1, wherein in the first composite region, the layer thickness of the third carrier layer is in each case 0.05 to 0.9 times the size of the layer thickness of one selected from a group consisting of the first carrier layer, the second carrier layer and the fourth carrier layer or of the layer thickness of each layer of a combination of at least two of these.

13. The system according to claim 2, wherein in the second composite region, the layer thickness of the first carrier layer or the fourth carrier layer or the layer thickness of each of both of these layers is in each case 1.1 to 20 times the size of the layer thickness of the second carrier layer or the third carrier layer or each of both of these layers.

14. The system according to claim 2, wherein in the second composite region, the second composite layer is not joined to the third composite layer.

15. The system according to claim 2, wherein the folded planar composite comprises a third composite region;
    wherein the third composite region comprises a third layer sequence comprising as layers overlapping one another in the direction from the further fixing surface to the first fixing surface the first composite layer, the second composite layer and the fourth composite layer;
    wherein in the third composite region, the second composite layer is joined to the fourth composite layer;
    wherein the third composite region is adjacent to the first composite region; wherein the recess comprises a third recess region;
    wherein the third recess region is adjacent to the first recess region;
    wherein the recess has a third maximum depth in the third recess region;
    wherein the first maximum depth is greater than the third maximum depth;
    wherein the third maximum depth is greater than the second maximum depth;
    wherein the third composite region is located at least partially between the third recess region and the first fixing surface or the further fixing surface.

16. The system according to claim 15, wherein the first maximum depth is 1.01 to 3 times the size of the third maximum depth.

17. The system according to claim 15, wherein the third composite region is characterized by a third width;
    wherein the third width is in a range of from 1 to 12 mm;
    wherein the recess has a length perpendicular to the third width;
    wherein the third recess region is wider than the third width over at least 50% of the length.

18. The system according to claim 1, wherein the folded planar composite is a container precursor surrounding an interior.

19. The system according to claim 1, wherein the folded planar composite is constructed in one piece.

20. A method comprising as method steps:
    a) providing a folded planar composite,
        wherein the folded planar composite comprises a first composite layer, a second composite layer, a third composite layer, a fourth composite layer and a first composite region;
        wherein an intermediate region is located between the first composite layer and the second composite layer;
        wherein the first composite layer comprises a first carrier layer;
        wherein the second composite layer comprises a second carrier layer;
        wherein the third composite layer comprises a third carrier layer;
        wherein the fourth composite layer comprises a fourth carrier layer;
        wherein the first composite region comprises a first layer sequence comprising as layers overlapping one another in a direction from the intermediate region through the first layer sequence the second composite layer, the third composite layer and the fourth composite layer;
        wherein in the first composite region, the second composite layer is joined to the third composite layer and the third composite layer is joined to the fourth composite layer;
        wherein in the first composite region, the second carrier layer has not been skived;
        wherein in the first composite region, the third carrier layer is characterized by a smaller layer thickness than one selected from the group consisting of the first carrier layer, the second carrier layer and the fourth carrier layer or than each layer of a combination of at least two of these;
    b) providing a first fixing element comprising a first fixing surface and a further fixing element comprising a further fixing surface;
        wherein the first fixing surface or the further fixing surface or both comprises a recess comprising a first recess region;
        wherein the recess has a first maximum depth in the first recess region;
    c) bringing into contact the fourth composite layer with the first fixing surface, the first composite layer with the further fixing surface, and the first composite layer with the second composite layer;
        wherein the first composite region is located at least partially between the first recess region and the first fixing surface or the further fixing surface;
    d) joining the first composite layer to the second composite layer.

21. The method according to claim 20, wherein in method step a) the folded planar composite further comprises a second composite region;
    wherein the second composite region comprises a second layer sequence comprising as layers overlapping one another in a direction from the intermediate region through the second layer sequence the second composite layer, the third composite layer and the fourth composite layer;
    wherein in the second composite region, the third composite layer is joined to the fourth composite layer;
    wherein in the second composite region, the first carrier layer or the fourth carrier layer or each of both these layers is characterized by a greater layer thickness than the second carrier layer or the third carrier layer or than each of both of these layers;
    wherein in method step b) the recess further comprises a second recess region;
    wherein the recess has a second maximum depth in the second recess region;
    wherein the first maximum depth is greater than the second maximum depth;
    wherein in method step c) the second composite region is located at least partially between the second recess region and the first fixing surface or the further fixing surface.

22. The method according to claim 20, wherein in method step d) the first fixing surface or the further fixing surface or both vibrates against the planar composite with
    a) a frequency in a range of from 10 to 50 kHz, or
    b) an amplitude in a range of from 3 to 20 μm, or
    c) both.

23. The method according to claim 20, wherein in method step d) the joining is a sealing by a transfer of an ultrasonic vibration from the first fixing element or the further fixing element or both to the folded planar composite.

24. The method according to claim 23, wherein the ultrasonic vibration is excited for a duration in a range of from 50 to 500 ms.

25. The method according to claim 20, wherein in method step a) the folded planar composite is a container precursor,
   wherein in method step d) the joining is a closing of the container precursor.

26. The method according to claim 25, wherein before method step c) a foodstuff is introduced into the container precursor.

27. The method according to claim 25, wherein before method step c) the container precursor is sterilized.

28. A closed container obtainable by the method according to claim 20.

* * * * *